(12) United States Patent
Godard et al.

(10) Patent No.: US 9,747,238 B2
(45) Date of Patent: Aug. 29, 2017

(54) COMPUTER PROCESSOR EMPLOYING SPLIT CROSSBAR CIRCUIT FOR OPERAND ROUTING AND SLOT-BASED ORGANIZATION OF FUNCTIONAL UNITS

(71) Applicant: Mill Computing, Inc., Palo Alto, CA (US)

(72) Inventors: Roger Rawson Godard, East Palo Alto, CA (US); Arthur David Kahlich, Sunnyvale, CA (US); Sebastien Paul Maurice Mirolo, San Francisco, CA (US); David Arthur Yost, Los Altos, CA (US)

(73) Assignee: MILL COMPUTING, INC., Palo Alto, CA (US)

( * ) Notice: Subject to any disclaimer, the term of this patent is extended or adjusted under 35 U.S.C. 154(b) by 482 days.

(21) Appl. No.: 14/312,274

(22) Filed: Jun. 23, 2014

(65) Prior Publication Data

US 2015/0370738 A1 Dec. 24, 2015

(51) Int. Cl.
*G06F 9/34* (2006.01)
*G06F 13/40* (2006.01)
*G06F 13/42* (2006.01)

(52) U.S. Cl.
CPC ...... *G06F 13/4022* (2013.01); *G06F 13/4221* (2013.01)

(58) Field of Classification Search
CPC .................. G06F 9/30109; G06F 9/34
See application file for complete search history.

(56) References Cited

U.S. PATENT DOCUMENTS

| 5,111,431 | A | | 5/1992 | Garde | |
|---|---|---|---|---|---|
| 5,852,741 | A | * | 12/1998 | Jacobs | ................ G06F 9/30072 712/215 |
| 5,954,811 | A | | 9/1999 | Garde | |
| 8,095,780 | B2 | * | 1/2012 | Leijten | .................. G06F 9/3836 712/215 |
| 2005/0132171 | A1 | * | 6/2005 | Bharadwaj | .............. G06F 8/445 712/217 |

\* cited by examiner

Primary Examiner — Farley Abad
(74) Attorney, Agent, or Firm — Gordon & Jacobson, P.C.

(57) ABSTRACT

A computer processor including a plurality of functional units that performs operations that produce result operands at different characteristic latencies over multiple cycles. An interconnect network provides data paths for transfer of operand data between functional units. The interconnect network includes first and second crossbar parts. The first crossbar part is configured to route result operands produced with the lowest characteristic latency to any other functional unit. The second crossbar part is configured to route result operands with higher characteristic latency relative to the lowest characteristic latency to the first crossbar part where such result operands are in turn routed to any functional unit. In another aspect, the functional units can be organized as multiple slots where each slot can produce multiple result operands of different characteristic latencies in the same cycle, and wherein each slot employs separate result registers for each characteristic latency present on the slot.

11 Claims, 22 Drawing Sheets

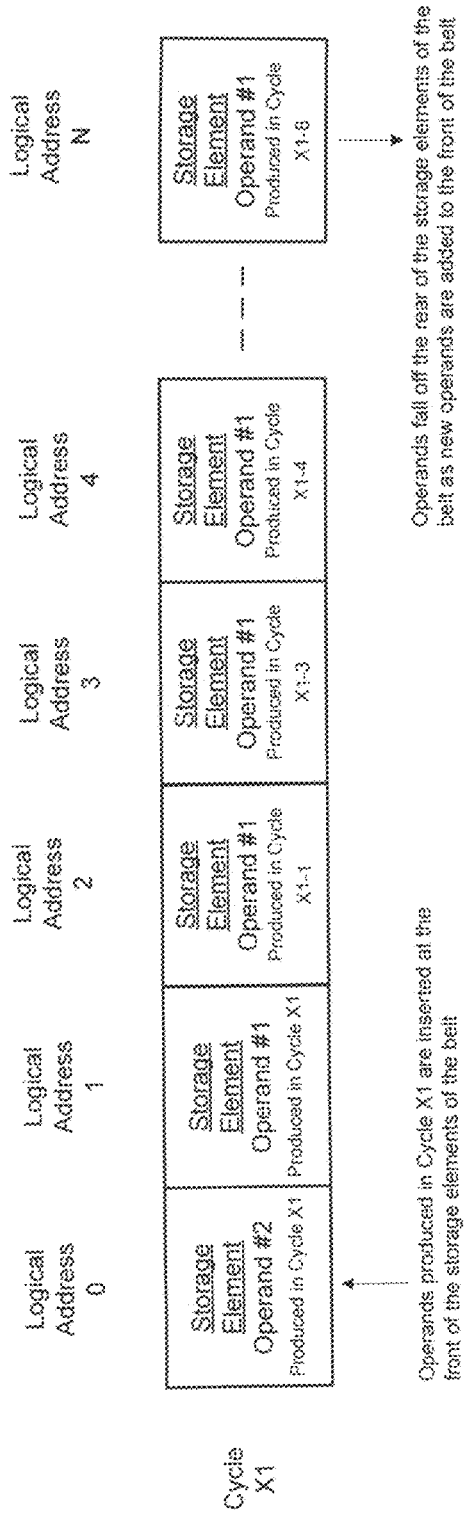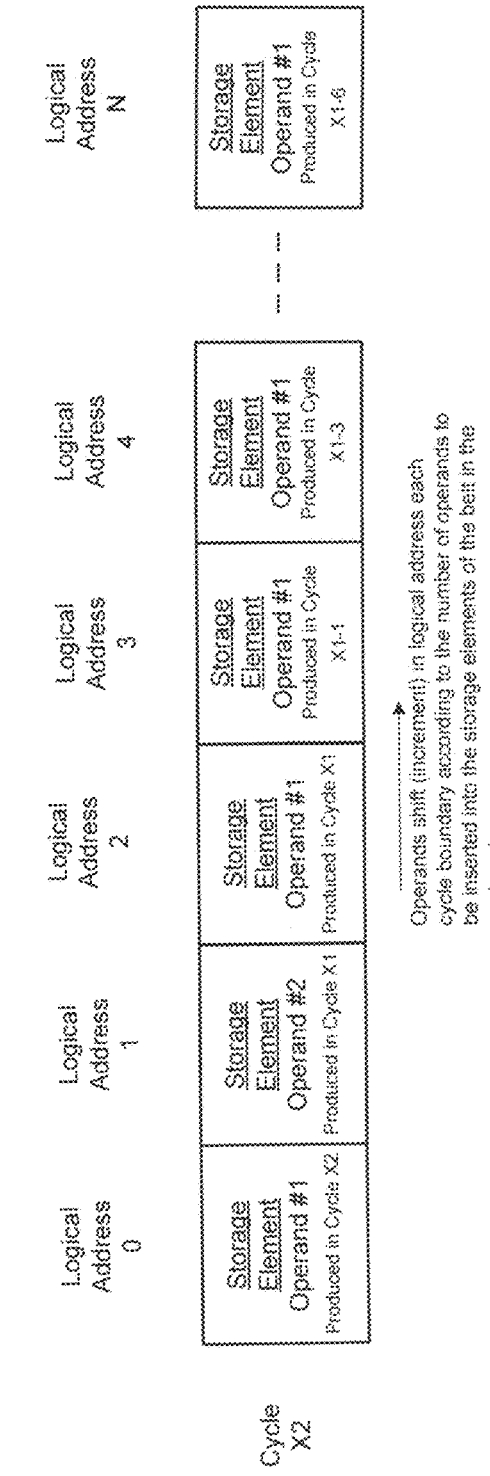
FIG. 3A
FIG. 3B

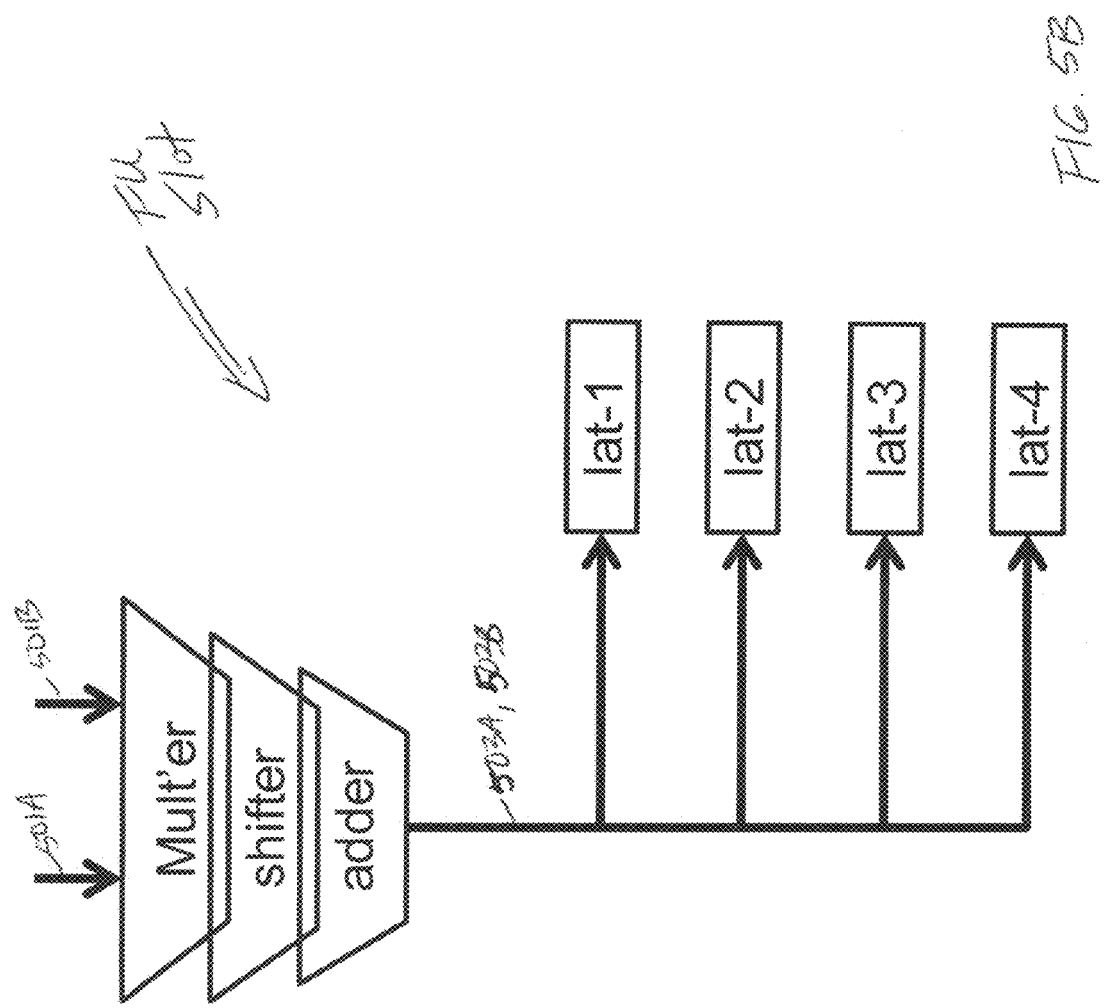

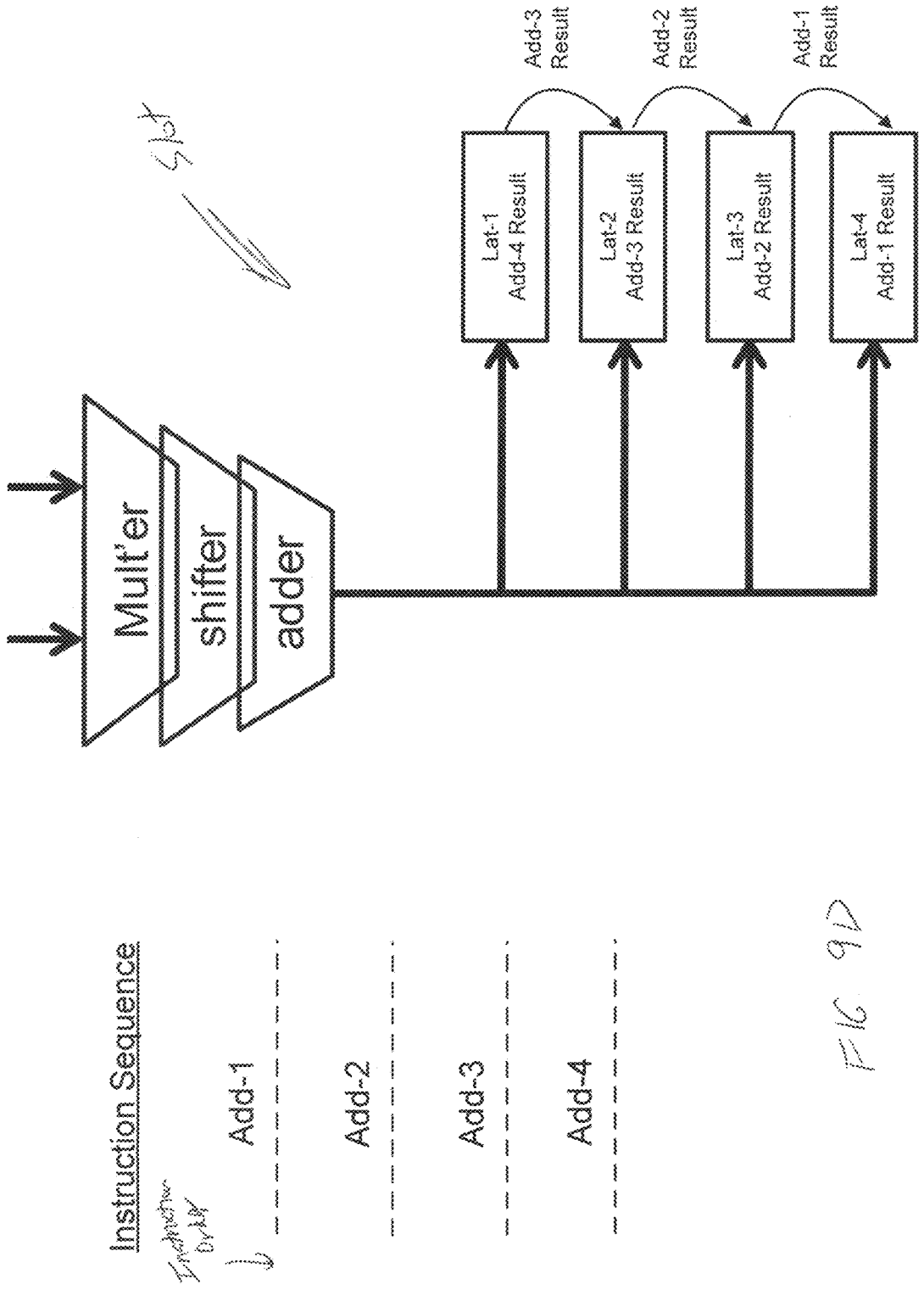

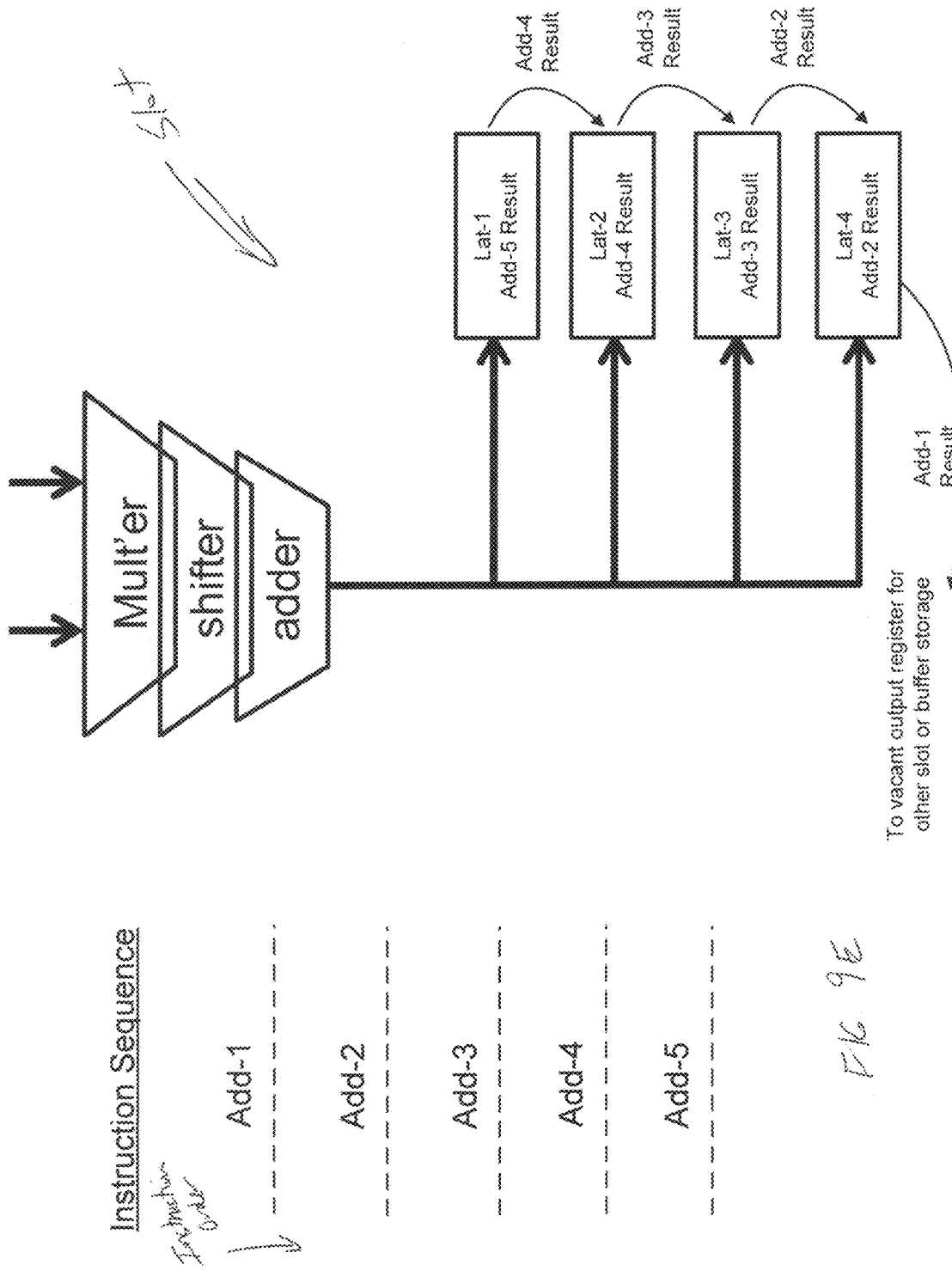

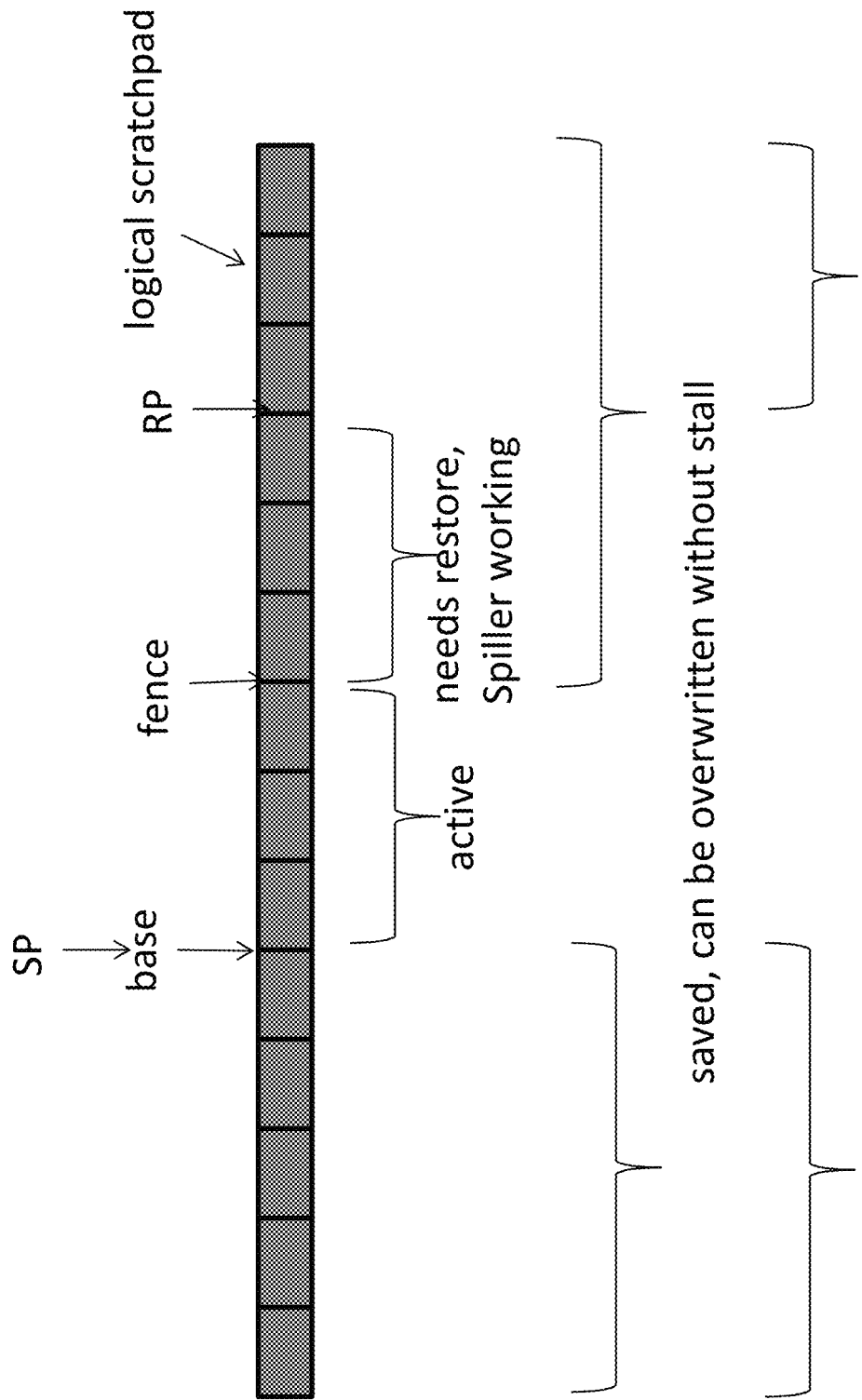

COMPUTER PROCESSOR EMPLOYING SPLIT CROSSBAR CIRCUIT FOR OPERAND ROUTING AND SLOT-BASED ORGANIZATION OF FUNCTIONAL UNITS

BACKGROUND

1. Field

The present application relates generally to computer processors and, more specifically, to mechanisms for storing and referencing transient operands that are produced and consumed by the computer processors.

2. State of the Art

Computer processors execute operations on data. An individual data value (an operand) is produced by some producer operation, recorded, and then used later by one or more other consumer operation. The time between production and consumption by the last consumer is the lifetime of the operand. Operands vary widely in lifetime, but lifetimes can usually be loosely categorized into persistent (or global) lifetimes that last for an appreciable fraction of total program execution; local lifetimes that last for the duration of a function or several statements in the program; and transient lifetimes that last for only portions of a single expression in the program. These categories are not sharp, and programs exhibit a continuum of lifetimes, but the rough grouping is strong enough that computer hardware usually contains different storage means for operands of each category. For example, persistent operands may use a software-provided heap in memory, while local operands may use a hardware-assisted stack and transient operands use a wholly hardware register bank.

Transient operands are ubiquitous and very common. For example, if the source program contains the expression "A+B+C" then the computer will execute a first add operation of A and B, and then a second add operation of the result of the first add operation to C. The A+B result is typically transient and will be discarded as soon as it is consumed by the second add operation, although it may have a longer lifetime if the same A+B calculation appears elsewhere and the intermediate result can be reused.

Many prior art computer processors employ a set of general registers, which are storage devices that can hold a single operand each. Machine operations like addition take their arguments from and deliver their result to registers. Thus, a register is the holding place for transient operands. When the lifetime of an operand ends, the register holding it can simply be overwritten by some other newly computed operand. Register usage by a program is very high because there are so many transients. Consequently, computer processor designers go to great lengths to ensure that access to registers is very fast and that there are enough registers to hold any reasonable transient population. Operands that do not fit in the available registers must be kept elsewhere, typically in memory, and access to such spilled operands takes tens to hundreds of times longer than access to a register. Because of the speed advantage of registers, registers not needed for transients are commonly used for frequently-referenced operands with more-than-transient lifetimes, even very long lived global operands. Each extra operand that can reside in the registers improves the speed of the program by avoiding lengthy memory access. This design force tends to cause designers to increase the number of registers in a design, so that more operands can be register resident. Balancing this force are two other effects of increased register count: instruction entropy and hardware complexity.

Entropy refers to the information-theoretic density of the machine representation (the encoding) of instructions to be executed. Each instruction must encode an indicator of the operation to be performed (the opcode) and the places that data arguments for the instruction must come from and results go to (the addresses for the source and result operands). Typical computational operations (such as an add) require two source operand addresses and one result operand address, in addition to the opcode. The operand addresses are register numbers when the arguments and results are in registers. When a design increases the number of addressable registers, it necessarily also increases the size of the address required to indicate which register to use. Thus, if there are eight registers (as in some early machines), an operand address occupies three bits and a register-based add operation uses nine bits for addressing, whereas if there are 128 registers (as in some recent machines), an operand address occupies seven bits and an add requires 21 bits of address.

Unfortunately, other considerations often dictate that instructions themselves must occupy a whole power-of-two number of bits, such as 16 or 32. Increasing the number of registers (and hence the number of address bits in an instruction) then necessarily reduces the number of bits available for the opcode and other purposes. In practice, it is impractical to have more than 32 registers while retaining a fixed 32 bit instruction length. Moreover, extra registers increase the total size of a program even if the design uses a wider or variable-length instruction to admit more than 32 registers. The increased program size and decode complexity may cause problems with the memory bandwidth and instruction cache of the machine.

Besides the entropy effect, increasing the number of registers also increases the complexity, chip area, and power requirements of the machine. Each potential functional unit consumer of an operand and each functional unit producer of a result operand must be able to communicate with each register, and thus involve connections that directly and super-linearly increase the required chip area and power. Moreover, modern processors typically include a bypass network whose complexity increases non-linearly. The bypass network is used to deal with pairs of operations that have a producer-consumer relationship, i.e. the transient result of the first is immediately used by the second. The bypass network avoids the latency in moving the result operand from the first operation into a register and then fetching it again as a consumer operand for the second operation. Instead, special hardware circuitry detects the producer-consumer relation and the bypass network routes the transient operand directly from the producing functional unit (such as an adder) to the consumer without waiting for the operand to reach the register. However, the bypass network is often the critical timing path of the whole machine, so any slowdown of the bypass network slows down the execution of every operation. Consequently, the design of a register-based machine reflects a balance between the storage performance advantages of extra registers and the encoding and execution performance costs of those registers.

However, a designer is not necessarily restricted to using registers for transients. There are other architectural categories that avoid many of the register problems by not using general registers in the first place. Two of these alternative approaches are accumulator machines and stack machines.

In an accumulator machine there is exactly one register for transient operands, although there may be other registers for longer-lived operands as well. All operations take one of their inputs from the accumulator, and place their result in the accumulator. Because there is only one, addressing the accumulator is implicit and does not require any address bits in the operation. Consequently, a computational operation contains only a single address, for the second argument, not three as in a general register machine. Of course, the first operand of an expression must be placed into the accumulator by an extra operation to start things off, which adds some extra cost to the use of an accumulator. In practice accumulator designs eliminate any entropy problems, and accumulator machines frequently have very small instructions, with a net gain even allowing for the extra operations to load the accumulator. Such designs also eliminate the bypass network because the producer and the following consumer are necessarily the same, namely the accumulator. This makes expressions such as "A+B+C" have a compact encoding and rapid execution.

However, an accumulator machine is optimal only if the most recent transient is immediately needed in the expression. In an expression like "(A*B)+(C*D)" there are two multiplies, both of which must be done before the add can sum their results. On an accumulator machine, the second multiply and the add can be done using the accumulator, but the result of the first multiply must be saved somewhere or it will be overwritten by the result of the second.

In a stack machine, transient operands are stored in a last-in-first-out (LIFO) stack, so that temporaries not needed immediately can simply be pushed into a stack. In such a stack machine, the computational operations contain no addresses at all, but operate on the top two operands in the stack by removing or popping them from the stack and pushing the result onto the top of the stack. As in the accumulator machine, the encoding requires extra operations to preload the stack with any operands that are not transients. However, operation encoding density is very good even allowing for these costs, and no bypass network is required.

Despite their advantages, accumulator and stack designs are rarely used where performance is a concern because they are inherently sequential in execution. Because there is only one accumulator (or one top of stack) they can execute only one operation at a time, whereas most modern processor designs try very hard to execute more than one operation simultaneously in parallel.

Note that it is possible to put more than one accumulator machine or stack machine into a single computer or chip, but that approach gains little because each must have its own instruction decoder and other components. It is also possible to put more than one accumulator into a single machine, but the result is called a general register machine with the drawbacks noted above.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processing system that includes a computer processor having a plurality of functional units that performs operations specified by the at least one instruction over the multiple cycles, wherein the operations produce result operands at different characteristic latencies over the multiple cycles. An interconnect network provides data paths for transfer of operand data between the plurality of functional units. The interconnect network includes first and second crossbar parts. The first crossbar part is configured to route result operands produced with the lowest characteristic latency to any other functional unit. The second crossbar part is configured to route result operands with higher characteristic latency relative to the lowest characteristic latency to the first crossbar part where such result operands are in turn routed to any functional unit.

In one embodiment, the characteristic latencies can be defined in terms of number of machine cycles. The lowest characteristic latency can correspond to a single machine cycle.

In another embodiment, the functional units can be organized as multiple slots where each slot can produce multiple result operands of different characteristic latencies in the same cycle, and wherein each slot employs separate result registers for each characteristic latency present on the slot. The result register of each slot that stores a result operand of lowest characteristic latency is operably coupled to the input side of the first crossbar part. The result registers of each slot that stores result operands of higher characteristic latency is operably coupled to the input side of the second crossbar part.

In another aspect, a computer processor is provided with a plurality of functional units that performs operations specified by the at least one instruction over the multiple cycles. The functional units are organized as multiple slots where each slot can produce multiple result operands of different characteristic latencies in the same cycle, and wherein each slot employs separate result registers for each characteristic latency present on the slot. Each slot can include data paths to store their result operands produced by the functional units of the slot into the appropriate result registers of slot that correspond to the characteristic latencies of such result operands.

BRIEF DESCRIPTION OF THE DRAWINGS

FIGS. 3A and 3B are schematic illustrations that show the logical model of operation of the belt storage elements of FIG. 2 as viewed by program code.

FIGS. 5A and 5B are schematic illustrations of a logical slot-based organization of functional units, which can optionally be part of the execution logic of FIG. 2.

FIG. 8 is a schematic illustration of exemplary operations performed by the execution logic of FIG. 2 in processing CALL/RETURN operations; similar operations can be performed in handling interrupts.

FIGS. 9A-9E are schematic illustrations of a logical slot-based organization of functional units with a daisy-chain of output registers, which can optionally be part of the execution logic of FIG. 2.

FIGS. 10A-10F are schematic illustrations of exemplary operations (including save and restore operations of a Spiller), which can optionally be carried out by the execution logic of FIG. 2.

DETAILED DESCRIPTION OF ILLUSTRATIVE EMBODIMENTS

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, or branch operation.

The term "instruction" is a unit of logical encoding including zero or more operations. For the case where an instruction includes multiple operations, the multiple operations are semantically performed together.

Figure 1A:
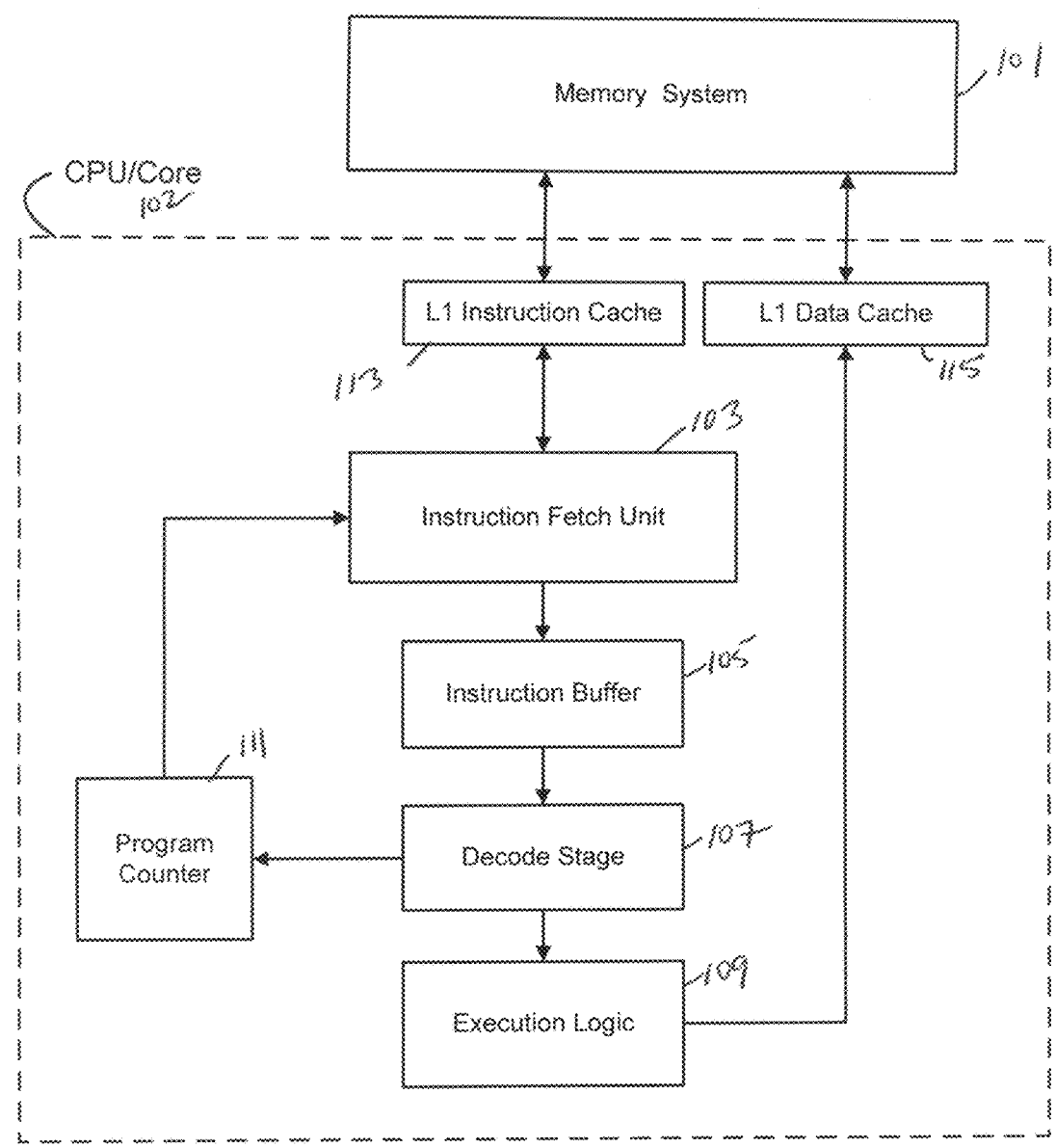
FIG. 1A is a schematic block diagram of a computer processing system according to an embodiment of the present disclosure.

In accordance with the present disclosure, a sequence of instructions is stored in the memory system 101 and processed by a CPU (or Core) 102 as shown in the exemplary embodiment of FIG. 1. The CPU (or Core) 102 includes a number of instruction processing stages including at least one instruction fetch unit (one shown as 103), at least one instruction buffer or queue (one shown as 105), at least one decode stage (one shown as 107) and execution logic 109 that are arranged in a pipeline manner as shown. The CPU (or Core) 102 also includes at least one program counter (one shown as 111), at least one L1 instruction cache (one shown as 113), and an L1 data cache 115. The L1 instruction cache 113 and the L1 data cache 115 are logically part of the hierarchy of the memory system 101. The L1 instruction cache 113 is a cache that stores copies of instruction portions stored in the memory system 101 in order to reduce the latency (i.e., the average time) for accessing the instruction portions stored in the memory system 101. In order to reduce such latency, the L1 instruction cache 113 can take advantage of two types of memory localities, including temporal locality (meaning that the same instruction will often be accessed again soon) and spatial locality (meaning that the next memory access for instructions is often very close to the last memory access or recent memory accesses for instructions). The L1 instruction cache 113 can be organized as a set-associative cache structure, a fully associative cache structure, or a direct mapped cache structure as is well known in the art. Similarly, the L1 data cache 115 is a cache that stores copies of operands stored in the memory system 101 in order to reduce the latency (i.e., the average time) for accessing the operands stored in the memory system 101. In order to reduce such latency, the L1 data cache 115 can take advantage of two types of memory localities, including temporal locality (meaning that the same operand will often be accessed again soon) and spatial locality (meaning that the next memory access for operands is often very close to the last memory access or recent memory accesses for operands). The L1 data cache 115 can be organized as a set-associative cache structure, a fully associative cache structure, or a direct mapped cache structure as is well known in the art. The hierarchy of the memory system 201 can also include additional levels of cache memory, such as a level 2 and level 3 caches, as well as system memory. One or more of these additional levels of the cache memory can be integrated with the CPU 202 as is well known. The details of the organization of the memory hierarchy are not particularly relevant to the present disclosure and thus are omitted from the figures of the present disclosure for sake of simplicity.

The program counter 111 stores the memory address for a particular instruction and thus indicates where the instruction processing stages are in processing the sequence of instructions. The memory address stored in the program counter 111 can be used to control the fetching of the instructions by the instruction fetch unit 103. Specifically, the program counter 111 can store the memory address for the instruction to fetch. This memory address can be derived from a predicted (or resolved) target address of a control-flow operation (branch or CALL operation), the saved address in the case of a RETURN operation, or the sum of memory address of the previous instruction and the length of previous instruction. The memory address stored in the program counter 111 can be logically partitioned into a number of high-order bits representing a cache line address ($ Cache Line) and a number of low-order bits representing a byte offset within the cache line for the instruction.

The instruction fetch unit 103, when activated, sends a request to the L1 instruction cache 113 to fetch a cache line from the L1 instruction cache 113 at a specified cache line address ($ Cache Line). This cache line address can be derived from the high-order bits of the program counter 111. The L1 instruction cache 113 services this request (possibly accessing higher levels of the memory system 101 if missed in the L1 instruction cache 113), and supplies the requested cache line to the instruction fetch unit 103. The instruction fetch unit 103 passes the cache line returned from the L1 instruction cache 113 to the instruction buffer or queue 105 for storage therein.

The decode stage 107 is configured to decode one or more instructions stored in the instruction buffer or queue 105. Such decoding generally involves parsing and decoding the bits of the instruction to determine the type of operation(s) encoded by the instruction and generate control signals required for execution of the operation(s) encoded by the instruction by the execution logic 109.

The execution logic 109 utilizes the results of the decode stage 107 to execute the operation(s) encoded by the instructions. The execution logic 109 can send a load request to the L1 data cache 115 to fetch data from the L1 data cache 115 at a specified memory address. The L1 data cache 115 services this load request (possibly accessing higher levels of the memory system 101 if missed in the L1 data cache 115), and supplies the requested data to the execution logic 109. The execution logic 109 can also send a store request to the L1 data cache 115 to store data into the L1 data cache 115 at a specified address. The L1 data cache 115 services this store request by storing such data at the specified address (which possibly involves overwriting data stored by the data cache).

Figure 1B:
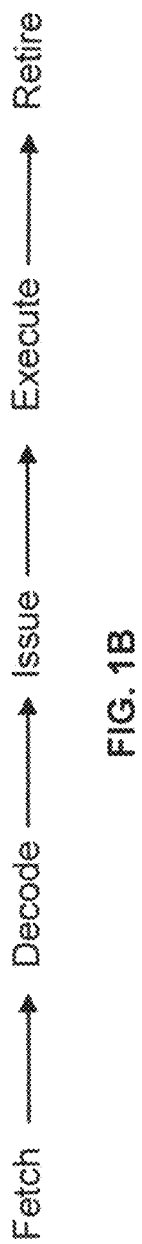
FIG. 1B is a schematic diagram of exemplary pipeline of processing stages that can be embodied by the computer processor of FIG. 1A.

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in four stages, namely, fetch, decode, issue, execute and retire as shown in FIG. 1B.

In the fetch stage, the instruction fetch unit 103 sends a request to the L1 instruction cache 113 to fetch a cache line from the L1 instruction cache 113 at a specified cache line address ($ Cache Line). The instruction fetch unit 103 passes the cache line returned from the L1 instruction cache 113 to the instruction buffer or queue 105 for storage therein.

The decode stage 107 decodes one or more instructions stored in the instruction buffer 107. Such decoding generally involves parsing and decoding the bits of the instruction to determine the type of operation(s) encoded by the instruction and generating control signals required for execution of the operation(s) encoded by the instruction by the execution logic 109. For the case where the instructions are wide instructions with a number of slots, the operations of the decode stage 107 can involve parsing slot-sized units according to the logical arrangement of slots within the instruction and decoding the operations of the units to generate control signals for execution of the operations of the slots of the instruction.

In the issue stage, one or more operations as decoded by the decode stage are issued to the execution logic 109 and begin execution. For the case where the instructions are wide instructions with a number of slots, multiple operations encoded by the wide instruction can be issued in parallel and all can begin execution together in the issue stage. Not all operations encoded by the wide instruction are required to be issued together in the issue stage.

In the execute stage, issued operations are executed by the functional units of the execution logic 109 of the CPU/Core 102.

In the retire stage, the results of one or more operations produced by the execution logic 109 are stored by the CPU/Core 102 as transient result operands for use by one or more other consumer operations in subsequent issue cycles.

During the execution of an operation by the execution logic 109 in the execution stage, the functional units can access and/or consume transient operands that have been stored by the retire stage of the CPU/Core 102. Note that some operations take longer to finish execution than others. The duration of execution, in cycles, is the latency of an instruction. Thus, the operations of the retire stage can be latency cycles after the issuance. Issued operations that have not yet completed and retired are "in-flight." Occasionally, the CPU/Core 102 can stall for a few cycles. Nothing issues or retires during a stall and in-flight operations remain in-flight.

The execution logic 109 includes one or more functional units (FUs) which perform primitive steps such as adding two numbers, moving data from the CPU proper to and from locations outside the CPU such as the memory hierarchy, and holding operands for later use, all as are well known in the art. Also within the execution logic 109 is a connection fabric or routing network functionality connected to the FUs so that data produced by a producer (source) FU can be passed to a consumer (sink) FU for further storage or operations.

The FUs and routing network of the execution logic 109 must be controlled by the executing program to accomplish the program aims. Rather than exert this control directly at a per-transistor or per circuit level, which would require much too voluminous control information in the program to be practical, the control is abstracted into a program model, an idealized logical representation of the CPU that the control provided by the program manipulates. As is well known, there are several possible such program models, including general-register machines, accumulator machines, and stack machines previously mentioned.

Because the program model is a logical representation of the CPU, it is not required that the CPU hardware actually be implemented in a form that closely matches the logical program model. So long as the hardware is able to present to the program the illusion that the CPU acts like the logical program model, it may internally be implemented in any way desired. This degree of freedom in hardware design is heavily exploited in the well-known art, and it is very common for the actual working of a hardware CPU to have little resemblance to the program model it presents.

Figure 2:
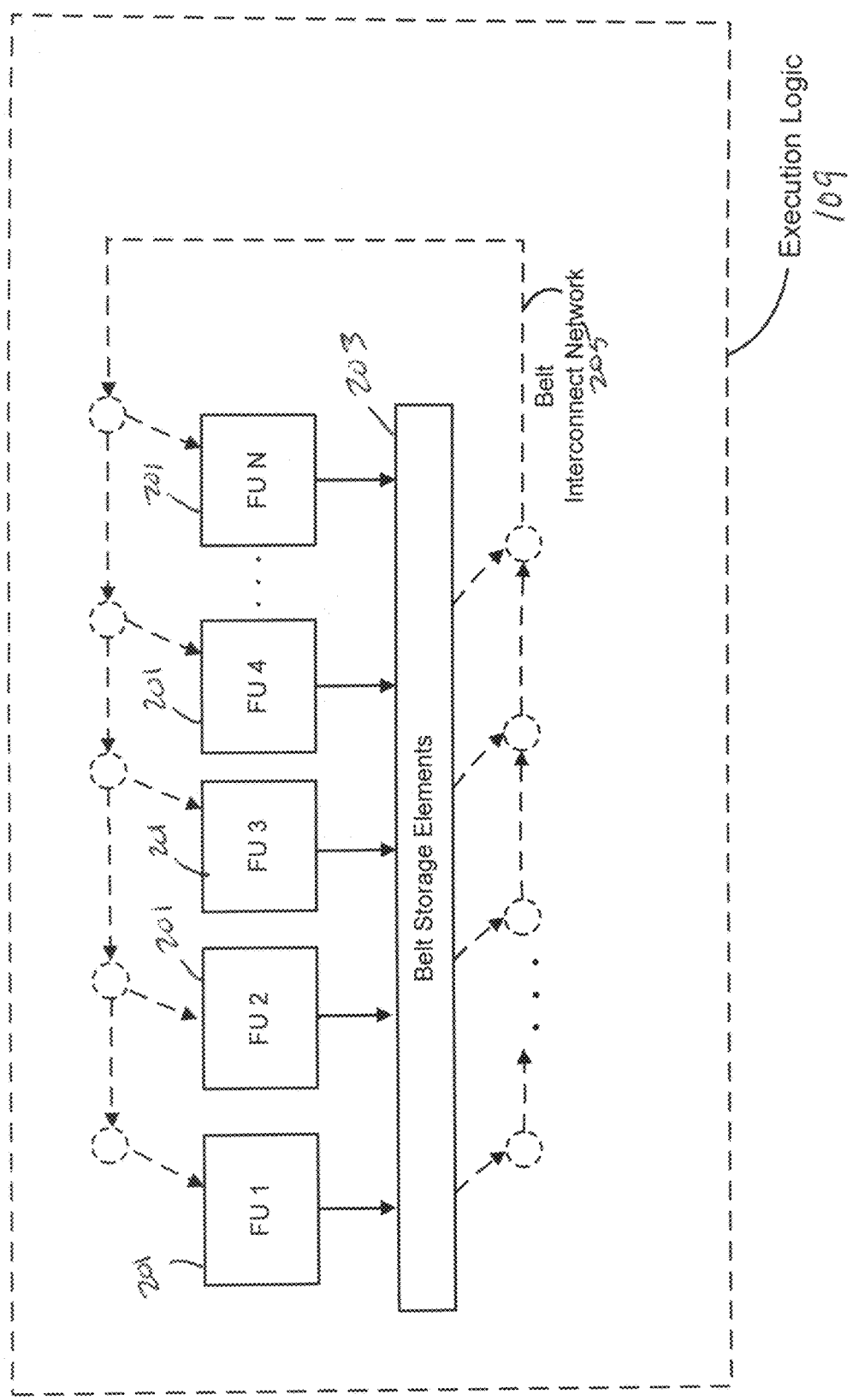
FIG. 2 is schematic illustration of components that can be part of the execution logic of the computer processor of FIG. 1A according to an embodiment of the present disclosure.

FIG. 2 is a schematic diagram illustrating the architecture of an illustrative embodiment of the execution logic 109 of the CPU/Core 102 of FIG. 1 according to the present disclosure, including a number of functional units 201. The execution logic 109 also includes a set of storage elements 203 (labeled "Belt Storage Elements") that are operably coupled to the functional units 201 of the execution logic 109 and configured to store transient operands that are produced and referenced by the functional units of the execution logic 109. A routing network 205 (labeled "Belt Interconnect Network) provides a physical data path from each respective belt storage element 203 to the functional units that can possibly consume the operand stored in the respective belt storage unit. The routing network 205 can also provide the functionality of a bypass routing circuit (directly from a producer functional unit to a consumer function unit).

The instructions processed by the processing stages of the CPU/Core 102 view the resources of the belt storage elements 203 according to a logical program model where the storage (injection) of the result operand(s) produced by the functional units of the execution logic 109 acts as a fixed-length queue or conveyor belt. This program model utilizes logical belt temporal addresses to explicitly refer to (or address) source operands that are accessed by a respective functional unit. The logical belt temporal addresses correspond to a pre-defined ordering scheme the reflects the temporal order in machine cycles that the result operands are produced by the functional units of the execution logic 109 as well as ordering rules with respect to operands that are produced in the same machine cycle. The instructions lack any explicit reference to result operands produced by a respective functional unit. Instead, it is understood that the result operand produced by a given functional unit will be added at the logical front of the belt. A single operation (or multiple operations) can also produce multiple result operands in a machine cycle. The ordering rules also address this situation as if the multiple result operands were single result operands from an ordered sequence of operations. Thus, in logical space, operands are queued or inserted to the front of the belt in accordance with the order that they are produced (and in accordance with ordering rules with respect to operands that are produced at the same machine cycle), and operands fall off the rear of the belt as new operands are added to the front of the belt. The logical belt temporal address of the operands shift (increment) each cycle boundary according to the number of operands to be injected into the belt in the next cycle. Furthermore, operations reference the operands stored by the belt by their logical belt temporal address. Thus, an ADD operation might specify that it is to add an operand at a logical belt temporal address of 3 (i.e., the fourth most recently produced operand) to the operand at the logical belt temporal address of 7 (i.e., the eighth most recently produced operand). This is a form of temporal addressing where the logical belt temporal address is dictated by the ordinal position in the time sequence in which operands are produced.

The temporal addressing scheme of the present disclosure also relies on a fixed number (set) of logical belt temporal addresses for storing operands. While from a logical view, the belt acts like a simple fixed-length bucket-brigade shift register for operands, and could be so implemented, any physical implementation will work so long as it permits new results operands to be stored and supplies temporally addressed operand arguments to subsequent operations.

In the logical program model of the belt, all operands produced by the functional units of the execution logic 109 in a given cycle are added to the front of the belt on the cycle boundary for read access in the next cycle or in subsequent cycles (until falling off the fixed length belt). Thus, when multiple operands are produced by the functional units of the execution logic 109 in a given cycle $C_N$, the multiple operands are added to the front of the belt on the cycle boundary for access in the next cycle $C_{N+1}$. A single operation can produce the multiple operands in a given cycle. Multiple operations can also produce the multiple operands in a given cycle. The belt is also arranged so that multiple operands can be read from the belt in any given cycle, so that the multiple operands can be used as source operands by the functional units 109. Each source operand can be accessed in the next cycle after it was produced until it falls off the belt. A single operation can operate on multiple operands read from the belt in a given cycle. Multiple operations can operate on multiple operands read from the belt in a given cycle. Note that operands fall off the fixed length belt as operands are added to the front of the belt on cycle boundaries.

Furthermore, there is a physical data path from each respective belt storage element (a source) 203 to the functional units (a sink) that can possibly access the operand stored in the respective belt storage element 203. This is a general routing network, labeled as Belt Interconnect Network 205, which is a structure which crops up throughout CPU and computer design. There are a variety of possible implementations of the Belt Interconnect Network 205 that optimize for various qualities such as path length, total cost, average delay and so on. Most of these designs are partially blocking, i.e. the use of one source-to-sink path may make a different source-to-sink path unavailable. Careful scheduling of operations can usually avoid such blockage. For ideal flexibility and minimal delay, the Belt Interconnect Network 205 can be a non-blocking design where the belt storage elements 203 (sources) can be connected to the functional units (sinks) in any one-to-one combination.

In order to support the logical program model of the belt and its temporal addressing scheme as described above, the decode stage 107 of the CPU/Core 102 can be configured to extract the logical belt temporal address for each source operand specified by the decoding of the instruction. Multiple logical belt temporal addresses for multiple source operands can be specified by the decoding of an instruction. Furthermore, the decode stage 107 operates to generate control signals used to access operands stored in the belt storage elements 203 for operations performed by the functional units of the execution logic 109 in the issue stage. Specifically, the decode stage 107 can be configured to map logical belt temporal addresses to physical addresses of the belt storage elements 203 in accordance with the logical program model of the belt as described above. In this logical model, the storage (injection) of the result operand(s) produced by the functional units of the execution logic 109 acts logically as a fixed-length queue or conveyor belt. Specifically, a new operand result is injected into the front of the fixed-length queue and the oldest operand is pushed out the other end of the fixed length queue. Thus, in the logical model, the fixed-length queue resembles a conveyor belt of storage elements for operands, with new results injected into the front storage element of the conveyor belt, passing along the length of the belt as subsequent results are injected in front of them, and eventually reaching the end and disappearing. The operands can shift in the queue on cycle boundaries according to the number of operands to be inserted into the storage elements of the belt at the same time.

The logical program model of the belt is evident from the context shown in FIGS. 3A and 3B. In this logical program model, the operations address the storage elements of belt as a producer implicitly, while addressing the storage elements of the belt as a consumer explicitly. Thus, operations can randomly access the operands stored in the storage elements of the belt. Each operation (such as an ADD) can specify a logical belt temporal address for one or more source operands, where logical belt temporal address of zero is conventionally the most recent value to have been injected. The logical temporal address of the result operand can be omitted from the semantic encoding of the operation as the logical temporal address of the result operand is implicit to the logical order of execution of the operation that produced the result operand. During execution of the operation by a respective functional unit, the functional unit accesses the source operand corresponding to that logical belt temporal address as its argument. Duplicate references to a logical belt temporal address by one or more operations can be permitted. Thus, from the logical view, the operations see the storage elements of the belt as an array of operands that they can index into, similarly to the array of registers that appears in a general register machine. However, unlike a register machine, the contents of the storage elements of the conveyor belt change every time a new operand is injected and the belt advances. Thus, an operation like "Add(3,4)" means to add the fourth and fifth most recent operands to have been injected into the storage elements of the belt, inject the result back as a new entry at the front of the belt at logical belt temporal address 0, and advance all the prior contents of the belt to the next higher logical belt temporal address except for the last, which falls off the end and disappears. Once this ADD operation has been executed, the arguments that it referenced at belt logical belt temporal addresses 3 and 4 are now at logical belt temporal addresses 4 and 5 respectively. When multiple operands are produced by the functional units of the execution logic 109 in a given cycle, the multiple operands can be added to the front of the belt at a cycle boundary for read access in the next cycle or in subsequent cycles (until falling off the fixed length belt). The belt is thus the realization of the ability to address into the (recent) time stream of operands as produced by the functional units. Hence, the term temporal addressing is used, in contrast to the spatial addressing used to reference registers or main memory.

In order to support the addition of a set N of zero or more operands into the belt in a given cycle, a logical shift operation that drops the same number N operands from the belt can be performed prior to the given cycle.

The number of logical belt temporal addresses of the belt is fixed and the belt is being continually filled with newly injected operands. Consequently, the period during which a given operand is available in the belt (before it falls off the end) is necessarily brief. This is appropriate for the great bulk of transient results, which have very brief lifetimes. However, if a transient has a longer lifetime than the duration of its period in the belt then it must be preserved from being lost off the end. Preservation may involve copying it to longer-lifetime non-temporal storage. It may also involve passing it through a null (identity) computational instruction which simply returns its argument as its result. This has the effect of re-injecting the operand again at the front of the belt, where it will have another period of life as it is moved toward the end by subsequent injections. Obviously identity re-injection may be repeated if necessary. It is also contemplated that the CPU/Core 102 can support operations encoded within the instruction that arbitrarily reorders belt contents (which can used for operand preservation) as well as operations encoded within the instruction that simply replaces the belt contents with a selection of its existing content.

Note that the temporal addressing of the logical program model of the belt as described herein requires some extra intelligence in programs such as compilers and assemblers that produce instruction sequences. These programs must keep track of the logical belt temporal addresses of transient operands stored in belt so that they can incorporate the correct logical belt temporal addresses into the operation encodings that they construct. Moreover, temporal addressing does not lend itself to manual creation of program encodings. While it is not difficult (given appropriate data structures) to track the positions of transient operands in software, it is quite difficult to do so mentally. Generally, except for extremely short code sequences (a handful of instructions at most) it is best to use some symbolic naming scheme.

In one embodiment, the belt is directly accessible by the functional units of the execution logic of the CPU/Core 102. The belt is measured in logical belt addresses (i.e., positions), where any position can hold any operand of any supported size. The number of positions (length) of the belt is fixed. For example, the length of the belt can be in the range of 8 to 32 positions or possibly up to 64 positions. Each position of the belt is limited in size, but is big enough to hold all supported operand sizes. In one example, operands can be power-of-two sizes up to a maximum size. If the maximum size is 8 bytes, the operands can be 1, 2, 4 and 8 bytes in size. If the maximum size is 64 bytes, the operands can be 1, 2, 4, 8, 16, 32 and 64 bytes in size. Note that belt is not measured in bits or bytes, the way the memory hierarchy. The belt is not part of the memory hierarchy, at all, and cannot be addressed by a memory address. The belt can be accessed by the functional units more quickly than cache and main memory of the memory hierarchy. Operands can be loaded onto the belt from the memory hierarchy (cache memory and main memory) and stored from the belt to the memory hierarchy by functional units that that execute LOAD and STORE operations. The cache memory and the main memory of the memory hierarchy is much larger in size than the belt. For example, the L1 data cache is typically 16 KBytes in size or more and main memory is much larger. Furthermore, the cache memory and the main memory of the memory hierarchy supports dynamic addressing and pointers, and can possibly be shared across cores and may support coherent concurrent access across cores in multi-core designs. Furthermore, the internal representation of the operands as stored on the belt can be different from the external representation of the operands as stored in the memory hierarchy. The operands stored on the belt cannot be changed once placed on the belt, which is a form of Static Single Assignment. The belt is organized as storage elements or register for individual operands, not as an array of bytes. The belt cannot be dynamically addressed and there is no indexing of belt addresses, and there are no pointers into the belt. The operands stored on the belt cannot be shared across cores in a multicore configuration. In this case, each core has its own belt, private to itself.

The management of the logical-to-physical address mapping for the belt storage elements 203 can involve incrementing all of the physical addresses for the whole set of belt storage elements 203. This can be realized by shifting a physical shift register. Alternatively, the effect of shifting the whole set of storage elements can be achieved by shifting the physical addresses of the register with wrap-around as needed. In essence, the array of storage elements becomes a circular buffer, and the belt storage elements 203 are implemented as a circular queue. When this is done, the physical array of belt storage elements that make up the circular queue can be twice the size of the logical belt temporal address space, i.e., if an instruction can specify eight different logical positions then there can be 16 physical positions in order to accommodate access to the current contents of the belt and also have space to add operands to the front of the belt if both conditions are maximal.

In yet another implementation, the belt storage elements 203 can be realized from the output latches or registers of the functional units of the execution logic 109. In this case, each functional unit producer retains it result in an output latch or register, and each such register has an associated physical address. Consumer functional units connect to these output latches through the Belt interconnect network 207. The output registers can be arranged as a CAM or distributed register array or other suitable implementation.

In yet another implementation shown in FIGS. 9A-9E, the functional units of the execution logic 109 can be organized as multiple slots where a single slot can execute operations of mixed latency while retaining the ability to issue one of many supported operations each cycle. As a consequence, it is possible for a single slot to produce the results of several operations in the same cycle. For example, if a three-cycle operation is issued in cycle zero, a two-cycle operation in cycle one, and a one-cycle operation in cycle two, then all three operations will produce their results in cycle three. To keep the results from colliding, separate output registers can be provided for each operation latency present on the slot, and operations employ data paths to steer their results to the output register appropriate for the latency of the operation. In this configuration, each one of the output registers is a producer for a given slot from the view of the logical belt. The output registers can also be used as the physical storage elements of the logical belt. Specifically, the output registers of each slot can be organized as a shift register, where the output register for the lowest latency operands (e.g., the lat-1 output register) is at the input end of the shift register and the output register for the highest latency operands (e.g., the lat-4 output register) is at the output end of the shift register. The operands are shifted to the next-higher latency output register between cycles. The operand contents of the highest latency output register can migrate to a vacant output register of another slot or to a buffer register (such as one managed by the spiller unit as described herein) as needed. This can aid in minimizing data traffic for adding operands to the logical belt as they are produced.

FIGS. 9A-9E shows an exemplary slot-based organization of functional units employing three functional units (an adder, a shifter and a multiplier) as part of a slot with four output registers labeled "lat-1," "lat-2," "lat-3," and "lat-4."

Figure 9A:
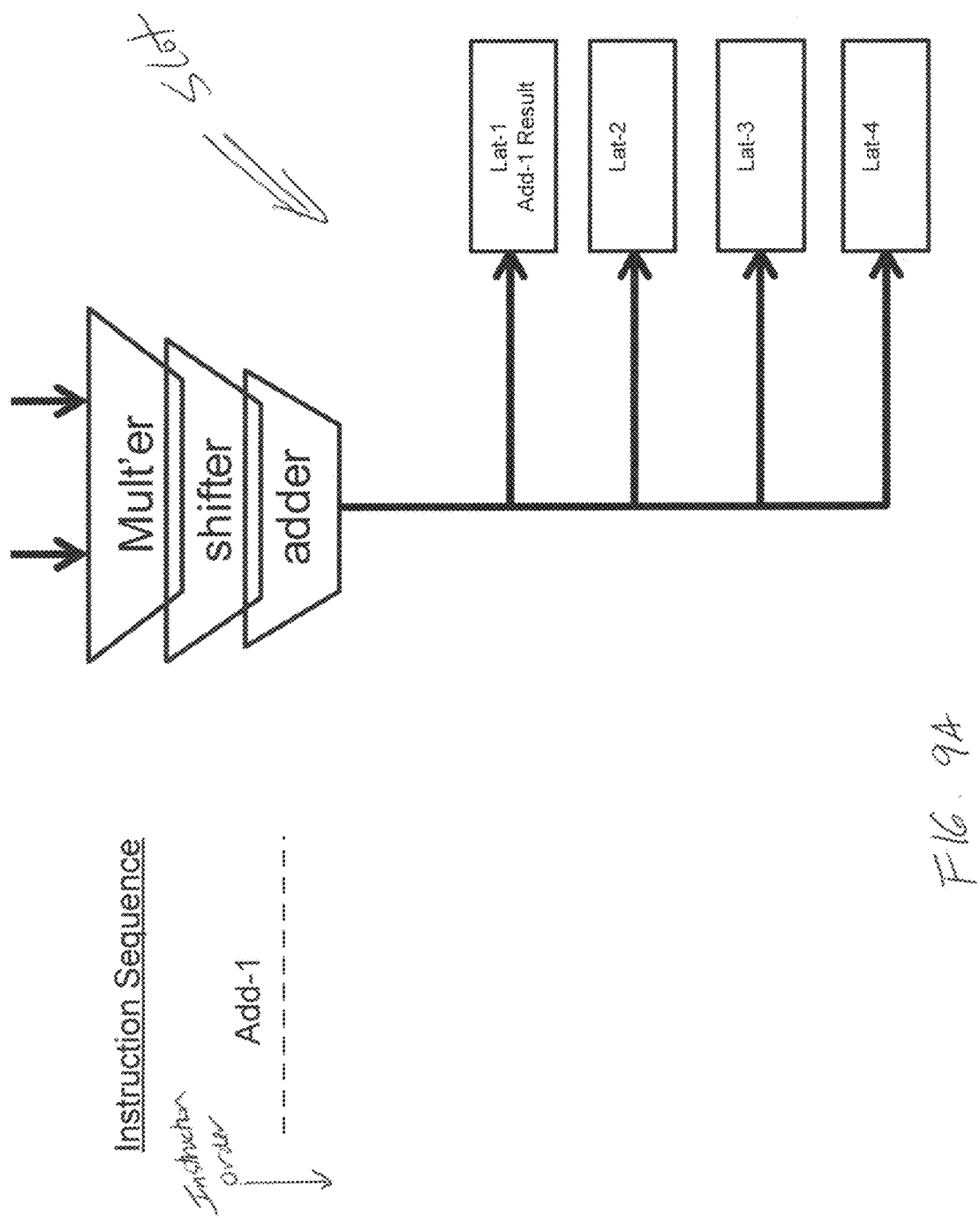
Figure 9B:
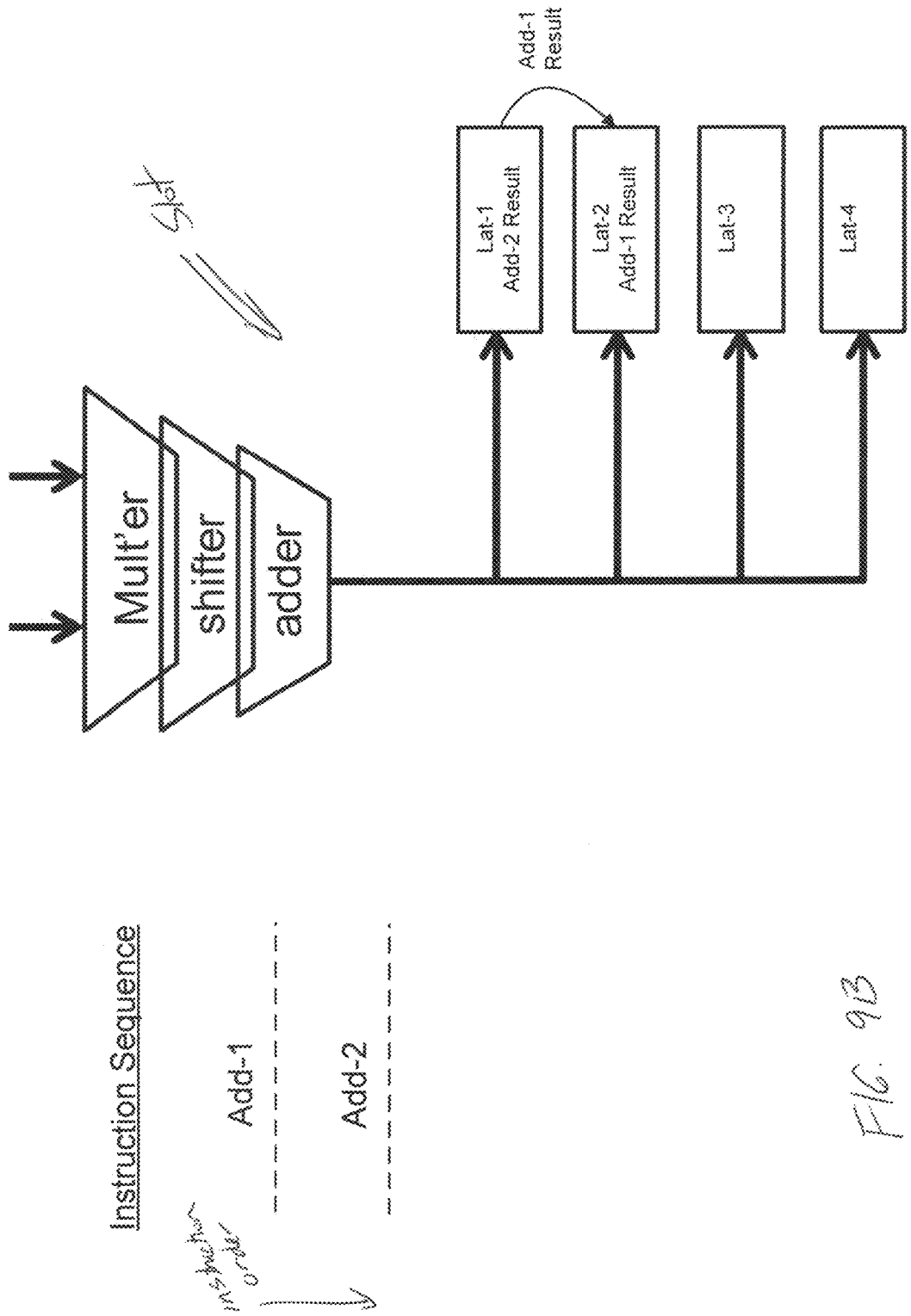
Figure 9C:
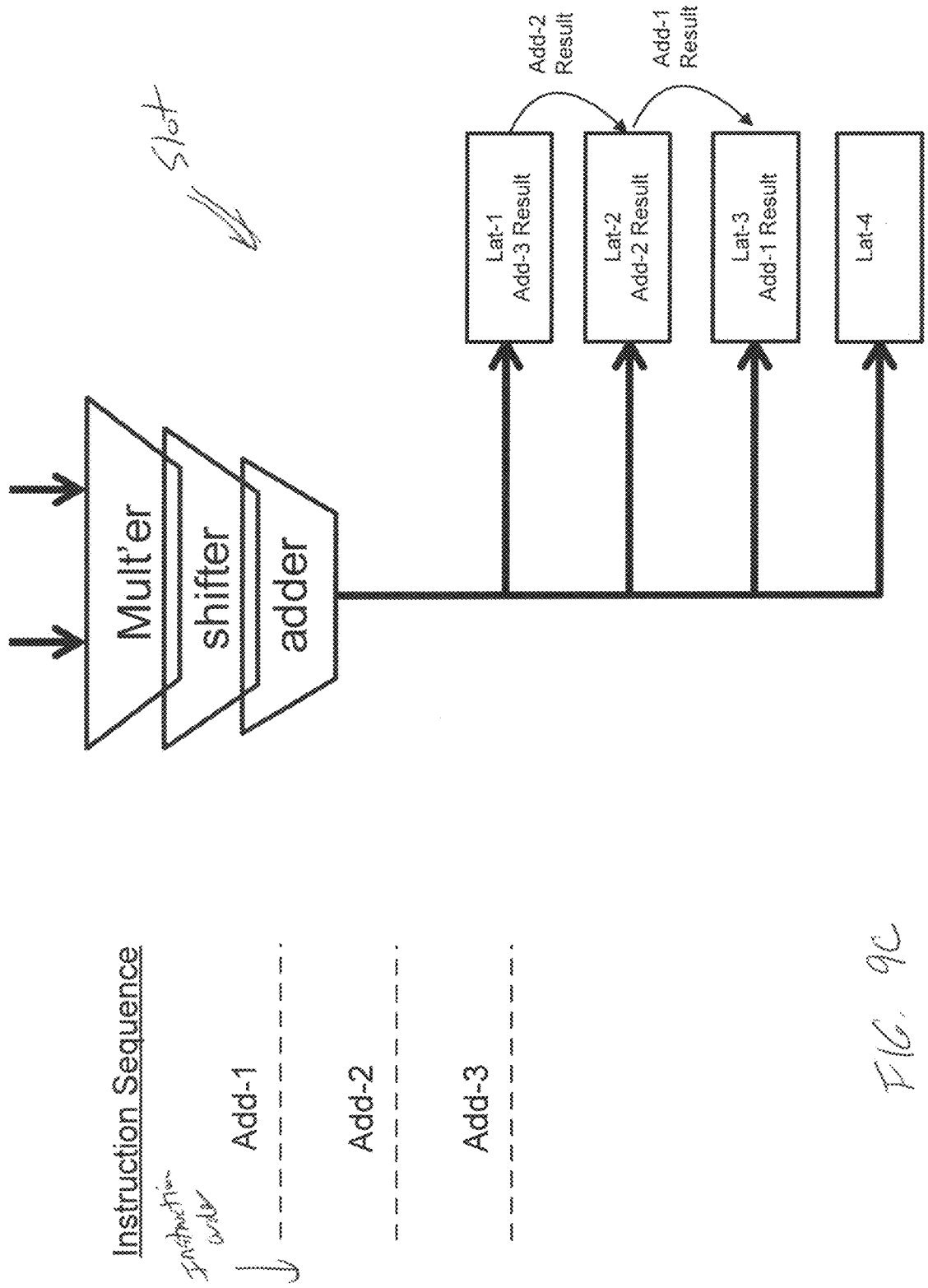

In this example, the processing of five sequential ADD operations (labeled add-1, add-2, add-3, add-4 and add-5) over time is illustrated to show the shift operation of the output registers between cycle. FIG. 9A shows the processing of the first add-1 operation. The add-1 operation (like the add-2, add-3, add-4, and add-5 operations) is a one cycle operation and thus produces an operand that is stored in the lat-1 output register of the slot. Thus, the result of the add-1 operation is stored in the lat-1 output register of the slot as shown. FIG. 9B shows the processing of the add-2 operation with its result stored in the lat-1 output register of the slot. The result of the add-1 operation is shifted between cycles from the lat-1 output register to the lat-2 output register of the slot. FIG. 9C shows the processing of the add-3 operation with its result stored in the lat-1 output register of the slot. The result of the add-2 operation is shifted between cycles from the lat-1 output register to lat-2 output register. The result of the add-1 operation is shifted between cycles from the lat-2 output register to the lat-3 output register. FIG. 9D shows the processing of the add-4 operation with its result stored in the lat-1 output register of the slot. The result of the add-3 operation is shifted between cycles from the lat-1 output register to the lat-2 output register. The result of the add-2 operation is shifted between cycles from the lat-2 output register to the lat-3 output register. The result of the add-1 operation is shifted between cycles from the lat-3 output register to the lat-4 output register. FIG. 9D shows the processing of the add-5 operation with its results stored in the lat-1 output register of the slot. In this case, highest latency output register (the lat-4 output register) is occupied, and thus the shifting is configured to store the contents of the lat-4 register (the results of the add-1 operation) to another storage buffer, such as a vacant output register in another slot or to a buffer register (such as one managed by the spiller unit as described herein). The result of the add-4 operation is shifted between cycles from the lat-1 output register to the lat-2 output register. The result of the add-3 operation is shifted between cycles from the lat-2 output register to the lat-3 output register. The result of the add-2 operation is shifted between cycles from the lat-3 output register to the lat-4 output register.

Other physical implementations of the belt storage elements 203 can also be used.

A modern CPU has many functional units, any of which may be producers of data for or consumers of data from any of the others. Getting everything where it is supposed to go, without interfering with everything else going elsewhere, requires a routing network called a bypass network connects all outputs with all inputs. In general, it is necessary that the bypass network accommodate a routing from any producer functional unit to any consumer functional unit, concurrently and with equal delay, so the bypass network implements a full crossbar. This crossbar is expensive in machine terms, and its cost increases as a power function of the number of functional units, so that it is often the bottleneck for CPU performance. In many CPUs, the hardware takes longer to get a value through the bypass crossbar than it did to compute the value in the first place.

In an out-of-order machine, the CPU maintains many operations in a partially activated state until all the required inputs are ready. In such a machine, an input of some operation may be delayed while traversing the bypass crossbar, but some other operation may have all its (bypassed) inputs and be ready for execution. With enough independent operations it is possible to keep the CPU's functional units busy and hide the delay in the bypass. However, many programs contain long dependency chains in which the result of any one operation is needed as an argument to the immediately following operation, and there are few or no other operations to execute. In that case each operation must wait for the full bypass time before it can execute, typically cutting the overall performance in half or worse.

In-order machines like VLIWs defer the problem of scheduling independent operations to a compiler rather than using CPU hardware for scheduling. However, a dependency chain in an in-order machine also requires that each operation complete and its result traverse the bypass before the next operation can execute. Because the hardware must assume dependency, in-order machines typically include the bypass time in the main cycle time, sharply lengthening the cycle. This causes every operation, whether dependent or not, to pay the bypass cost. Partly as a result, in-order machines typically have clock rates that are less those of out-of-order machines. To reduce the crossbar overhead, some VLIW machines split the functional units into two or more groups, such that bypass network within a group is faster (typically by a cycle) than bypass between groups. Much cleverness is devoted to scheduling instructions so that dependency chains are entirely within one group, but bypass overhead is significant regardless.

The execution logic 109 of the CPU/Core 102 as described herein does not use register-to-register operation semantics. Instead, it uses temporal addressing of the belt. Nevertheless, it is still necessary to route operation results from producing operations to the arguments of consuming operations. This is the function of the belt interconnect network 205.

Figure 4A:
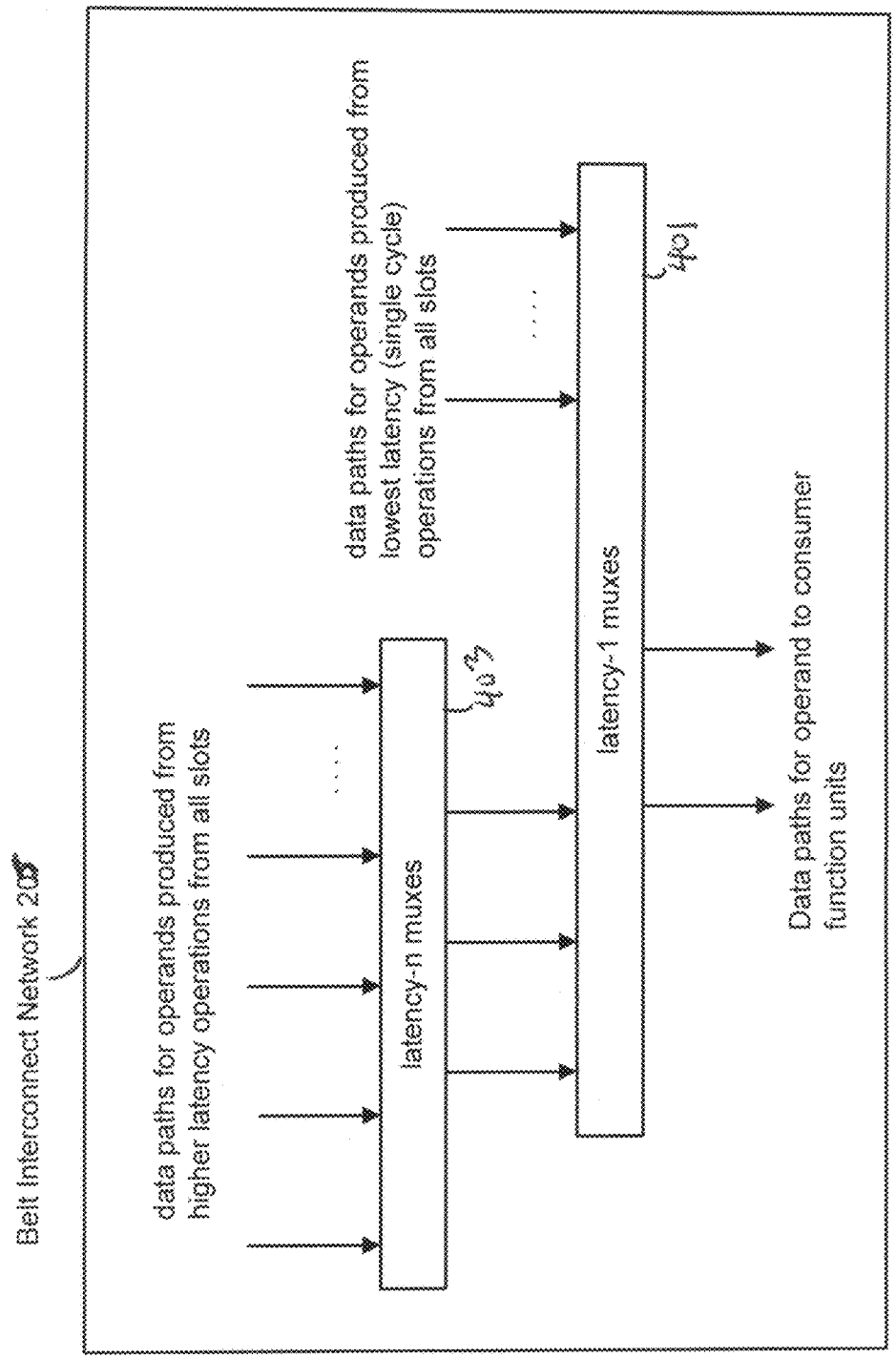
FIGS. 4A and 4B are schematic illustrations of an exemplary embodiment of a belt interconnect network, which can optionally be part of the execution logic of FIG. 2.
Figure 4B:
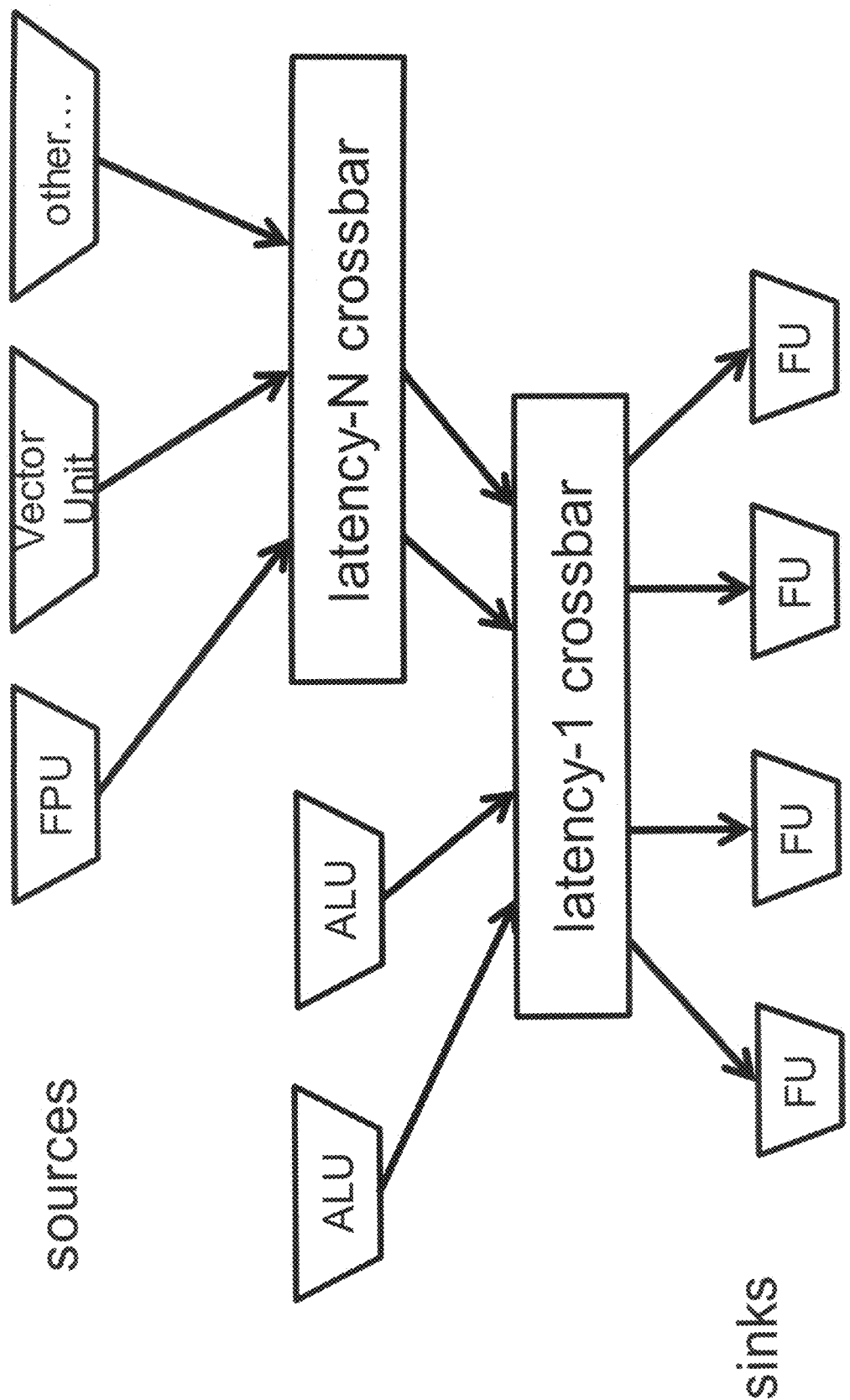

In one embodiment shown in FIGS. 4A and 4B, the belt interconnect network 205 is implemented as a split crossbar to reduce the average cost of bypass over that of the general every-producer-to-every-consumer routing network that is usually employed. This split crossbar is most valuable for statically-scheduled in-order machines, although the split crossbar may also be employed in out-of-order machines to reduce the average cost of dependency chains.

The operation of the split crossbar is based on the observation that, while all operations are equal in that any may give or receive results from any other, some operations are more equal than others. That is, certain operations occur much more frequently than others during execution. In particular, the common operations are those that have a natural execution time of a single cycle, while those that naturally would take two or more cycles are less common both as producers or consumers of operands. The split crossbar is organized to provide a dedicated shorter path for operations that provide their results in one cycle, while the results of operations taking two or more cycles to execute follow a longer path. This split by latency is different from the existing art that splits the bypass crossbar by pipeline (or equivalently by encoding slot in a VLIW instruction, or by functional unit).

As shown in FIGS. 4A and 4B, the split crossbar circuit includes two parts, a lower crossbar part 401 that is capable of routing the results produced by the lowest latency (single cycle) operations, and only those results, to any consumer functional unit, and an upper crossbar part 403 that is capable of routing the higher latency results produced by the other functional units (all other producers) to the lower part 401 where they are in turn routed to any consumer functional unit. This is shown schematically in FIG. 4B.

Figure 5A:
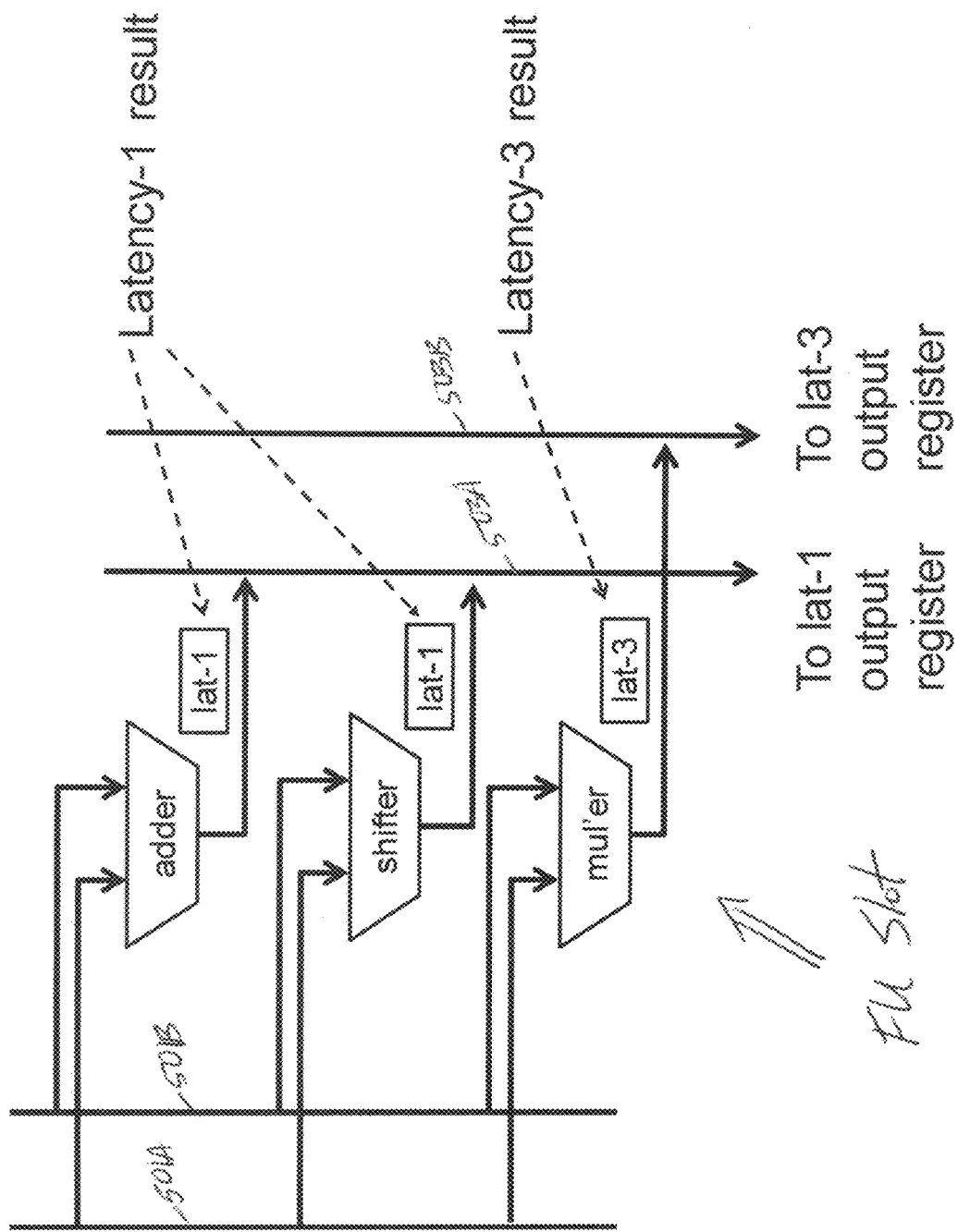

In one embodiment, the split crossbar of FIGS. 4A and 4B can be used to route operands between functional units of a slot-based architecture as described above with respect to FIGS. 9A-9E. An example of this organization is shown in FIGS. 5A and 5B. FIG. 5A shows three functional units (an adder, a shifter and a multiplier) organized as a part of a slot. All three functional units access source operands via shared input data paths 501A, 501B for the slot. The adder and shifter functional units produce results in one cycle and thus store their results in the "lat-1" output register via shared output data path 503A. The multiplier functional unit produces results in three cycles and thus store its results in the "lat-3" output register via output data path 503B. FIG. 5B shows the organization of output result registers of the slot, including four output registers labeled "lat-1," "lat-2," "lat-3," and "lat-4." Note that each one the four output registers is a producer for a given slot from the view of the logical belt. In this type of organization, the split crossbar of FIGS. 4A and 4B can be configured to route operands as follows. The lower crossbar part 401 is configured to route the results produced by the lowest latency (single cycle) operations for every slot of functional units, and only those results, to any consumer functional unit. Thus, in the example of FIGS. 5A and 5B, the lat-1 output register for each slot feeds the input side (top side) of the lower cross-bar part 401. The upper crossbar part 403 is configured to route the higher latency results produced by the slots of functional units to the lower crossbar part 401 (all other producers), where they are in turn routed to any consumer functional unit. Thus, in the example of FIGS. 5A and 5B, the "lat-2" to "lat 4" output registers for each slot, if used, feed the input side (top side) of the upper crossbar part 403. From the point of view of the split crossbar, the lowest latency result operands shifted out of the lat1 output registers of the slots as described above with respect to FIGS. 9A-9E become higher latency result operands that are routed by the upper crossbar part 403. The lower crossbar part 401 allows routing of any one of the lowest latency result operands stored in the lat-1 registers of the slots to any functional unit for use in the next cycle. An example where the functional units are organized with five slots capable of executing one-cycle operations and an additional forty other multi-cycle operations. The upper crossbar part 403 will route a selected single one of the 40 multi-cycle producers to the lower crossbar part 401, where it joins the five single-cycle results. The lower crossbar part 401 routes one of the six values to a selected destination consumer functional unit. In consequence, what had been a 45-to-1 routing circuit becomes (for single-cycle ALU results) a 6-to-1 circuit, or (for other values) a 40-to-1 circuit cascaded with a 6-to-1 circuit. A 6-to-1 routing is sharply faster than a 45-to-1, while a 40-to-1 cascaded with a 6-to-1 is not much worse than a 45-to-1 network.

Note that the fundamental cycle time of the CPU/Core 102 can be set so as to include a basic single-cycle operation and a traversal of the lower part 401 of the split crossbar. This is significantly faster than the basic operation plus a traversal of a full crossbar would be. As a result, the cycle time can be reduced (or equivalently the clock rate increased), and most operations using the single-cycle operations (whether statically scheduled or involved in dependency chains) can execute more quickly. Of course, all the multi-cycle operation results must traverse both parts 401 and 403. Depending on the physical implementation, it may even take longer to traverse both halves of a split bypass than it would have taken to traverse a unified bypass. However, the values traversing both halves are a small portion of the total traffic, while the larger portion (from the single-cycle operations) is significantly accelerated, yielding a net saving on average.

This example focuses on the ALUs as the generators of the largest part of the most time-critical traffic in the split crossbar. However, CPUs and programs vary in their use of different kinds of operations, and the designer of a particular CPU should choose which instructions can afford to suffer traversal of both halves of the split crossbar, and which are critical and need to be routed only by the lower part 401. The choice may be guided to achieve best performance overall for a particular program mix, or to lower the cost of particularly critical operations, or to meet some other appropriate criterion. It is also possible to apply the split more than once, so that the crossbar circuit is split into three or more sections to accommodate more than two priority classes of operations.

Figure 6:
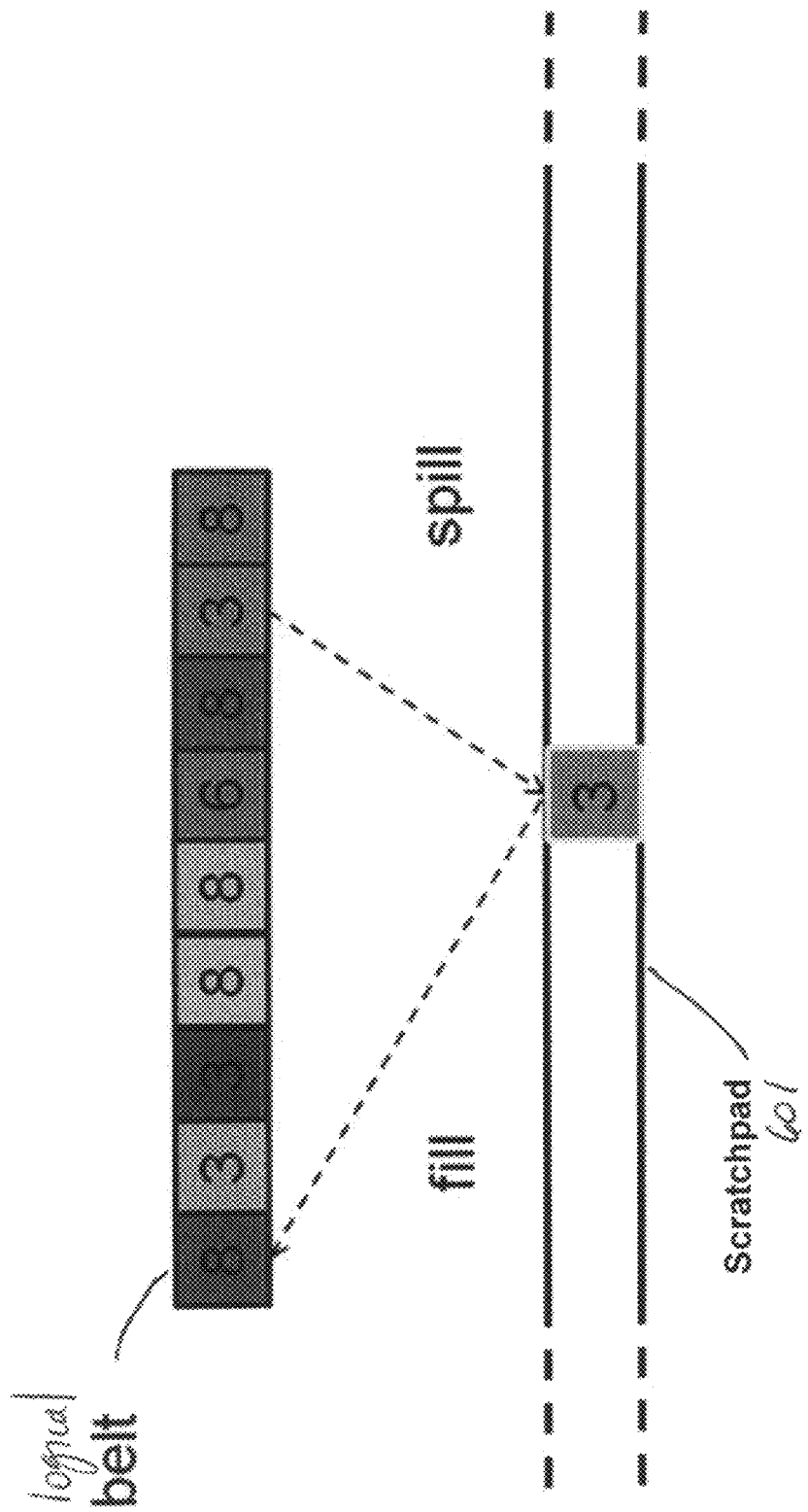
FIG. 6 is a schematic illustration of a scratchpad memory, which can optionally be part of the execution logic of FIG. 2.

The execution logic 109 of the CPU/Core 102 can also include an internal memory circuit, which is referred to herein as the scratchpad 601, as shown in FIG. 6. The scratchpad 601 can be accessed (SPILL operation) to copy an operand from the logical belt (employing logical-to-physical address mapping to access the corresponding belt storage element 203) before it overwritten, such it can be stored for an arbitrarily long time and used for a later operation. The scratchpad 601 can also be accessed (FILL operation) to copy an operand from scratchpad 601 to the front of the logical belt (employing logical-to-physical address mapping to access the corresponding belt storage element 203) for access by subsequent operations. Thus, the fill operation drops the result operand on the front of the logical belt just like an ADD or any other operation. Operands are referenced at a specific position in the scratchpad 601 by a literal byte number. Furthermore, the scratchpad 601 is byte addressable (continuing its similarity to memory) and so can hold several different operands at different positions. Operands written to the scratchpad 601 may be of any supported size, and the positions occupied can be naturally aligned for that width. Thus, the given byte address for each operand is aligned on predefined boundaries within the address space of the scratchpad 601. All scratchpad addresses are static (specified at compile time), like register numbers in a general register machine. Thus, the given byte address for each operand is statically-assigned.

Figure 7:
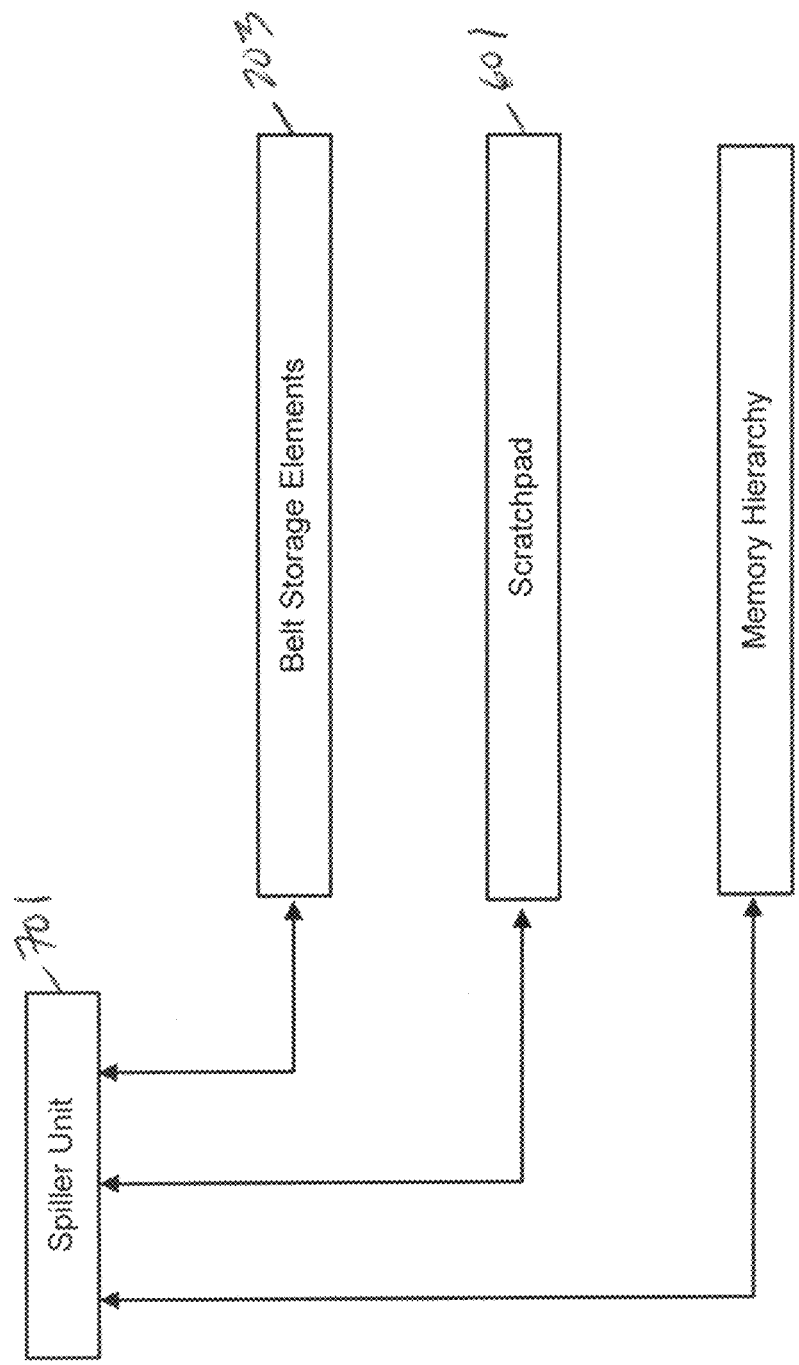
FIG. 7 is a schematic illustration of a spiller unit, which can optionally be part of the execution logic of FIG. 2.
Figure 6:
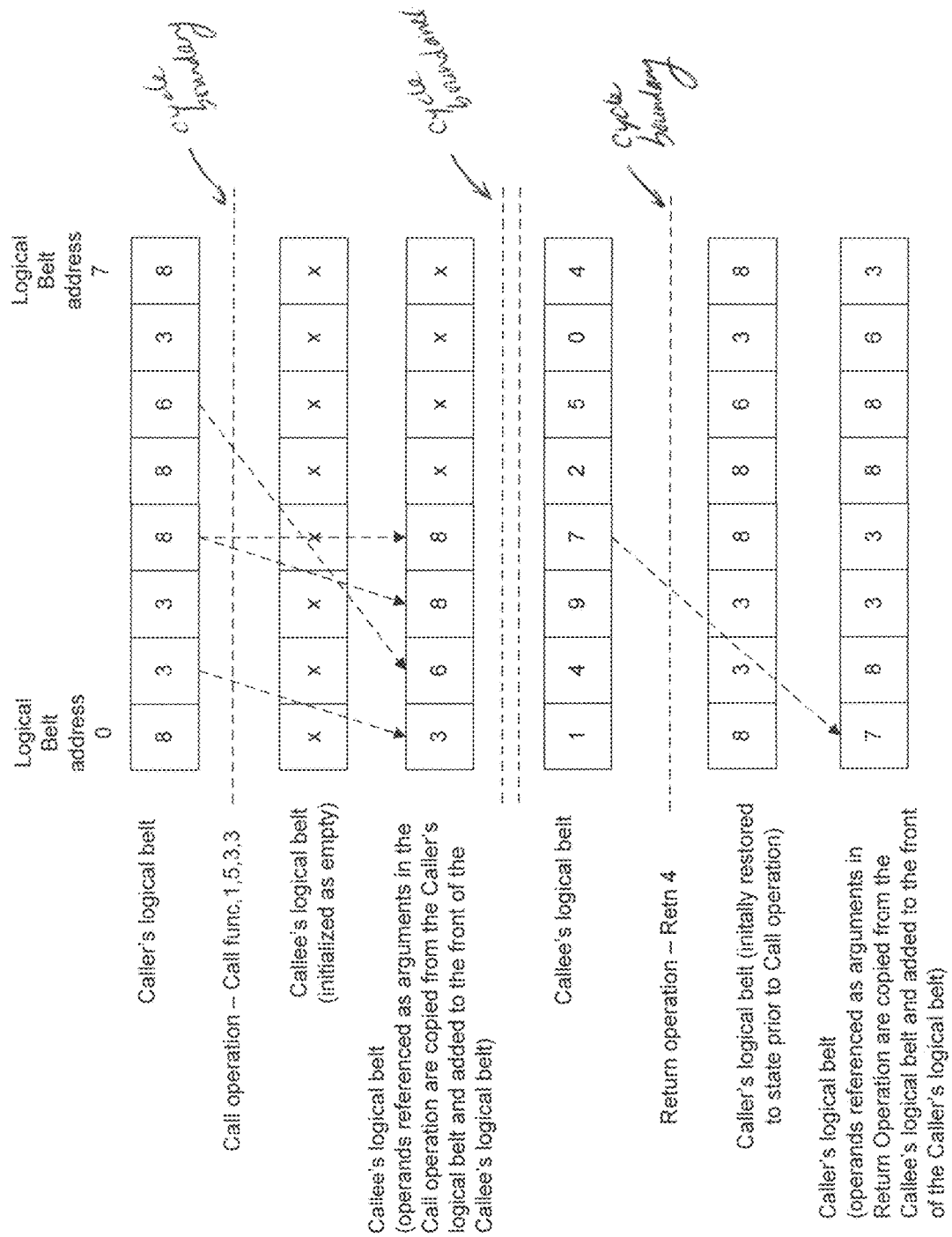

The contents of the belt storage elements 203 and the scratchpad 601 can be managed by a functional unit referred to as a spiller unit 701 as shown in FIG. 7. The spiller unit 701 is a hardware engine that is configured to save and restore processor context (including contents of the belt and possibly the scratchpad 601) across subroutine or functional calls. The operation of the spiller unit allows the belt to be configured such that it is strictly local to the current execution context. Thus, each subroutine or function body can have its own private logical belt. The operation of the spiller unit can also allow the scratchpad 601 to be configured such that it is strictly local to the current execution context. Thus, each subroutine or function body can have its own private scratchpad 601. This current execution context corresponds to a subroutine or function in the program source code, not to a thread as in other architectures. If the code includes a CALL operation, the spiller unit 701 is configured to save and restore processor context (including contents of the logical belt and possibly the scratchpad 601), and then restore the processor context when the called context executes a RETURN operation.

The CALL operation is an operation (or sequence of operations) within an instruction sequence (referred to as the Caller) that directs execution to a specified subroutine or function frame activation (referred to as the Callee). The function frame activation is an active instance of a subroutine or function which has not yet terminated with a RETURN operation. The RETURN operation within the Callee directs execution back to the Caller. Nested CALL and RETURN operations can be used to encapsulate frame activation within another. The semantics of the CALL operation can be embodied in a single operation or possibly be broken up into a stereotyped sequence of operations. Both cases are referred to as a CALL operation herein. Similarly, the semantics of the RETURN operation can be embodied in a single operation or possibly be broken up into a stereotyped sequence of operations. Both cases are referred to as a RETURN operation herein.

As shown in FIG. 8, the CALL operation can reference the entry point of the Callee as well as zero or more operands stored on the logical belt of the Caller at the time of the CALL operation that are to be passed from the Caller to the Callee. In the example of FIG. 8, the CALL operation references the entry point of the Callee "func" as well as four operands stored on the logical belt of the Caller at logical belt addresses 1, 5, 3 and 3 at the time of the CALL operation that are to be passed from the Caller to the Callee. The execution logic 109 processes the CALL operation by defining a private logical belt for the Callee that is initially empty. The operands (if any) that are referenced in the CALL operation are copied from the Caller's logical belt and added to the front of the Callee's logical belt. Multiple operands can be referenced in the CALL operation and copied from the Caller's logical belt and added to the front of the Callee's logical belt. Furthermore, the spiller unit 701 can be configured to save the processor context at the time of the CALL operation (including the contents of the Caller logical belt) in temporary storage, if need be. In the example of FIG. 8, the four operands stored on the logical belt of the Caller at logical belt addresses 1, 5, 3 and 3 are added to the front of the Callee's logical belt as shown. The resultant Callee logical belt (which includes the operands copied from the Caller logical belt and added to the front of the Callee's logical belt) can be accessed one cycle later and processed by the operations of the Callee function, which can operate over multiple machine cycles in many cases as indicated by the dashed-line cycle boundaries of FIG. 8.

The Callee function initiates a RETURN operation to return the control flow back to the Caller. The RETURN function can reference zero or more operands stored on the Callee logical belt at the time of the RETURN operation that are to be passed from the Callee to the Caller. In the example of FIG. 8, the RETURN operation references one operand stored on the Callee logical belt at logical belt address 4 at the time of the RETURN operation that is to be passed from the Callee to the Caller. The execution logic 109 processes the RETURN operation by using the spiller unit 701 to restore the saved processor context of the Caller, including the contents of the Caller logical belt. The operands (if any) that are referenced in the RETURN operation are copied from the Callee's logical belt and added to the front of the Caller's logical belt, which can push a corresponding number of the restored operands off the end of the Caller's logical belt. Multiple operands can be referenced in the RETURN operation and copied from the Callee's logical belt and added to the front of the Caller's logical belt. In the example of FIG. 8, the one operand stored on the Callee logical belt at logical belt address 4 is added to the front of the Caller's logical belt as shown. The resultant Caller logical belt (which includes the operands copied from the Callee logical belt and added to the front of the Caller's logical belt) can be accessed one cycle later and processed by the subsequent operations of the Caller.

Note the processing of the CALL and RETURN operations can occur in a nested manner when the program code includes nested CALL operations. Furthermore, the same processing of the CALL operation is carried out in the event that an interrupt occurs, which can be treated as an involuntary CALL operation. After the interrupt has been handled, the operations perform a RETURN operation that restores the processor context.

The logical belts can also be marked (associated) with different frame identifiers corresponding the specific CALL operations and corresponding subroutine or function frame activations that define the logical belts. In this case, the current frame number (which is assigned to the Callee function activation) can be derived by incrementing the frame number for the Caller function activation when processing the CALL operation. This frame number can be decremented when processing the RETURN operation such that the frame number then matches the Caller. Access to the logical belts can be controlled such that operations within a specific function frame activation can only access the logical belt that is tagged (associated) with the frame number that matches the specific function frame activation. In this manner, a private logical belt is accessed by each function frame activation.

Similarly, the address space of the scratchpad 601 can be marked (associated) the frame identifiers, and access to the scratchpad 601 can be controlled such that operations within a specific subroutine or function can only access the scratchpad access range is tagged (associated) with the frame number that matches the specific subroutine or function. In this manner, a private scratchpad is accessed by each subroutine or function. The address space of the scratchpad 601 can be managed with a window-based logical-to-physical mapping scheme to provide the private scratchpad for each function. In one embodiment, the physical registers of the scratchpad 601 can be arranged as a circular buffer and the window-based logical-to-physical mapping scheme allows access to a specific window (portion) of the circular buffer as assigned to the Callee frame identifier but hides access to the other portions of the circular buffer. In this case, the CALL operation can appear to rotate the registers of the circular buffer under the window, bringing the address space of the scratchpad 601 assigned to the Callee frame identifier into view, and hiding the other address space of the scratchpad 601. The RETURN operation can then move the window back to its position prior to the CALL operation, bringing the address space of the scratchpad 601 assigned to the Caller frame identifier into view, and hiding the other address space. The address space window of the scratchpad 601 that is assigned to the Caller frame identifier can have a variable size. The variable size can be dictated by an argument of a predefined operation called the SCRATCHF operation that can be encoded as part of a subroutine or function. The argument of the SCRATCHF operation is passed to the window-based logical-to-physical mapping scheme to define the size of the address space window of the scratchpad 601 that is assigned to the Callee frame identifier. In the event that the address space window of the scratchpad 601 that is assigned to a particular function is required to be spilled by the spiller unit 701, the size of the address space window as defined by the argument of the SCRATCHF operation can be used to save and restore only the address space window of that particular function across CALL operations. An attempt to address the scratchpad 601 beyond the allocated number can cause a fault in the executing program, analogous to addressing unallocated memory.

Note that certain operations can be in-flight when the CALL operation is executed. In this case, these operations can be allowed to complete execution and any result operand can be tagged (associated) with the frame identifier for the operation that produced the result operand. The spiller unit 701 can be configured to process the frame identifiers associated with the result operands to identify those result operands that are not produced by the operations of the Callee (which necessary includes the result operands produced by such in-flight operations) and temporarily store such result operands such that they are not added to the private logical belt for the Callee. The spiller unit 701 is further configured to add such result operands to the private logical belt for the Caller in conjunction with the processing of the RETURN operation.

While the hardware storage of the scratchpad 601 is necessarily of fixed size, the actual utilization of that storage varies from call frame context to call frame context. The program model can provide the illusion that each new call frame context has its own complete scratchpad, saved and restored across nested calls. However, if only a part of the physical scratchpad is in actual use in a given frame then it is wasteful to save and restore the unused portion.

In one embodiment, the execution logic of the CPU/Core 102 maintains two registers Base and Fence, and treats the scratchpad addresses coming from the instruction stream as logical addresses. The logical addresses are mapped to physical scratchpad addresses by adding a respective logical address to the address stored in the Base register (which is referred to below as Base), modulo the size of the scratchpad 601 (i.e. with wrap-around), and the physical addresses are then used to index the physical scratchpad to effect the access. This address mapping takes place on both SPILL and FILL operations and treats the physical scratchpad as a ring buffer.

The address stored in the Fence register (which is referred to below as Fence) partitions the logical and physical address space of the scratchpad 601 into valid and invalid parts, so it is necessary to set the Fence for a given frame activation to reflect the amount of scratchpad 601 that the call frame activation will need to access. As is well known, special registers such as the Fence register may have their value set directly by operations encoded in the executing program, or by STORE operations that address the register in a memory mapped I/O region of the memory hierarchy, or as a side effect of other execution. In the preferred embodiment, the Fence is set by executing the SCRATCHF operation by the program, where the SCRATCHF operation has a static argument giving the amount of scratchpad memory needed by the frame activation. The SCRATCHF argument must not exceed the total amount of physical scratchpad present in the machine. After the execution of SCRATCHF, possibly after some latency while the Fence changes take effect, the program is able to access scratchpad logical addresses from zero through the amount requested by SCRATCHF.

Before permitting the physical access, the logical address is checked against Fence, and only logical addresses between zero and Fence are permitted. Invalid addresses are rejected using whatever fault reporting mechanism is in use by the machine. This may instead be implemented such that the Fence contains a physical address and the check is against the physical address after mapping, if convenient.

The CALL, RETURN and SCRATCHF operations interact with the scratchpad 601 in the following steps.

In one step, the Caller function executes the CALL operation. In executing the CALL operation, the execution logic of the CPU/Core 102 saves the current address of Base, and sets Base to the physical position corresponding to Fence. This has the effect of making the formerly valid and accessible part of scratchpad 601 be no longer accessible to the new call frame activation. The spiller unit 701 can be configured to save, or arrange to be saved, the portion of scratchpad 601 that was formerly valid as needed.

In another step, the Called function (the Callee) executes the SCRATCHF operation. In executing the SCRATCHF operation, the execution logic of the CPU/Core 102 sets Fence to the logical sum of Base and the SCRATCHF argument. This has the effect of making the portion of scratchpad 601 between Base and Fence be valid and accessible to the program code of the Callee. The spiller unit 701 can be configured to verify that all previous scratchpad content in the newly accessible portion of scratchpad 601 have been successfully saved, stalling if necessary to wait for saving. Furthermore, the spiller unit 701 can optionally (and preferably) be configured to clear the newly accessible portion of scratchpad 601 so that there are no residual operands left from its prior use.

In another step, the execution logic of the CPU/Core 102 can perform SPILL and FILL operations that are part of the Callee, which access valid portions of the scratchpad 601 as described herein.

In another step, the execution logic of the CPU/Core 102 can perform a RETURN operation that is part of the Callee. In executing the RETURN operation, the execution logic of the CPU/Core 102 sets Fence to the physical position corresponding to Base. This has the effect of making inaccessible the portion of scratchpad 601 that was formerly accessible to the Callee. Furthermore, the execution logic of the CPU/Core 102 restores Base to the value previously saved during CALL. This has the effect of restoring accessibility to that portion of scratchpad 601 that had been accessible during the Caller frame activation that is being returned to. The spiller unit 701 can be configured to restore the former contents of the newly accessible caller's portion of scratchpad 601, stalling as necessary to complete the restore. The execution logic of the CPU/Core 102 can then continue execution of the Caller frame activation, which can include further SPILL, FILL, CALL and RETURN operations.

The save and restore of the contents of the scratchpad 601 as carried out by the spiller unit 701 can be effected in one of three ways. In the first way, save is performed as part of the CALL operation or SCRATCHF operation, and restore as part of the RETURN operation. This approach is simple to implement but forces CALL/SCRATCHF and RETURN to stall while save and restore takes place.

In a second approach, each possible logical address in the scratchpad 601 is associated with a first flag indicating whether data at the logical address has been saved since the current frame activation was entered by a CALL operation. For each SPILL operation, the first flag is checked and, if necessary, the spiller unit 701 performs a save of the scratchpad data that would be overwritten, and changes the flag to indicate that a save has taken place. A second flag is also associated with each possible logical address in the scratchpad, which indicates whether data at the logical address has been restored since the current frame activation was returned to by a RETURN operation. For each FILL operation, the second flag is checked and, if necessary, the spiller unit 701 performs a restore of the formerly saved contents, and changes the second flag to indicate that a restore has taken place. This approach has the advantage that the SCRATCHF operation, the Base and Fence registers, and the logical-to-physical mapping are no longer necessary, but it has the drawback that the SPILL and FILL operations will stall for save and restore to take place.

In the preferred approach, the spiller unit 701 of the execution logic of the CPU/Core 102 is implemented by a free-standing asynchronous save/restore engine or logic circuit (referred to as the Spiller below) which can be notified of a range of scratchpad addresses to be saved or restored, and which performs the save or restore in the background while program execution continues asynchronously.

In this approach, the CALL operation does not itself save the scratchpad portion accessible to the Caller frame activation, but instead merely notifies the Spiller that the scratchpad portion is eligible for saving. Similarly, the RETURN operations does not itself restore the previous content of the portions of scratchpad that had been used by the exiting Callee, but merely notifies the Spiller that such portion of scratchpad 601 is eligible for restoration.

As it is unknown to the Spiller whether the next action by the program will be a CALL (requiring save) or a RETURN (requiring restore), the Spiller must follow a policy in its saving and restoring that can deal efficiently with either future action. The policy must balance the resources it devotes to the possibility of a future CALL with those that it devotes to the possibility of a future RETURN. The optimal policy varies with the size of the physical scratchpad, the save/restore bandwidth of the Spiller, and the excepted behaviors of executed programs. In general, the policy will endeavor to have both saving and restoring done in advance of need.

A simple way to effectuate the Spiller policy is to recognize that the Base and Fence addressing mechanism treats the physical scratchpad as a ring buffer, where CALL/SCRATCHF operations advance the Base and Fence toward higher physical addresses (with wraparound) while the RETURN operation moves them toward lower physical addresses, also with wraparound. Hence, the youngest data in the physical scratchpad are between Base and Fence, while the next youngest are at the lower addresses adjacent to Base, while the oldest are at the higher addresses adjacent to Fence. The next youngest are those that will need to be restored in the event of a RETURN, while the oldest are those that will need to be saved in the event of a CALL.

Given this organization, the execution logic of the CPU/Core 102 maintains a save-point register storing a save-point address SP that indicates that the scratchpad contents between Fence and SP has been saved and the scratchpad contents between SP and Base remains to be saved. Note that data between the Base and Fence is in active use and need not be saved yet. Likewise, the execution logic of the CPU/Core 102 maintains a restore-point register storing a restore-point address RP that indicates that the scratchpad contents between Base and RP has been restored and that scratchpad contents between RP and Fence remains to be restored. Again, note that data between Fence and Base is in active use and should not be destroyed by restoring previously saved data. The execution logic is further configured to evaluate changes to Base and Fence and identify those that open a gap between SP and Base (after a CALL/SCRATCHF), which is closed by saving and incrementing SP, or those that open a gap between Fence and RP (after a RETURN), which is closed by restoring and decrementing RP, all with wraparound as appropriate.

Because this approach does save and restore in the background, it is immune to stall unless the demand for save/restore actions as driven by program execution exceeds the save/restore bandwidth of the Spiller. Such an excess can be detected (for a CALL) when a SCRATCHF would cause Fence to be set beyond SP. It can also be detected (for RETURN) where Base would be set to a value before RP. In either of these conditions the program must stall and wait for the Spiller to catch up. Details of exemplary operations of the execution logic in conjunction with the save and restore operations of Spiller that follow this approach are shown in FIGS. 10A-10F.

Figure 10A:

FIG. 10A shows the context of the Base, Fence, SP and RP registers where the execution is a steady state with the Spiller inactive. In this case, the scratchpad data portions outside the window for the active frame (between Base and Fence) have been saved (as indicated by SP and Fence pointing to the active window) and nothing remains to be saved (as indicated by SP and Base pointing to the same scratchpad address). Thus, the scratchpad data portions outside the window for the active frame can be overwritten without stall as noted in FIG. 10A. Similarly, the scratchpad data portions outside the window for the active frame (between Base and Fence) have been restored (as indicated by RP and Base pointing to the active window) and nothing remains to be restored (as indicated by RP and Fence pointing to the same scratchpad address). Thus, the scratchpad data portions outside the window for the active frame can be returned to without stall as noted in FIG. 10A.

Figure 10B:
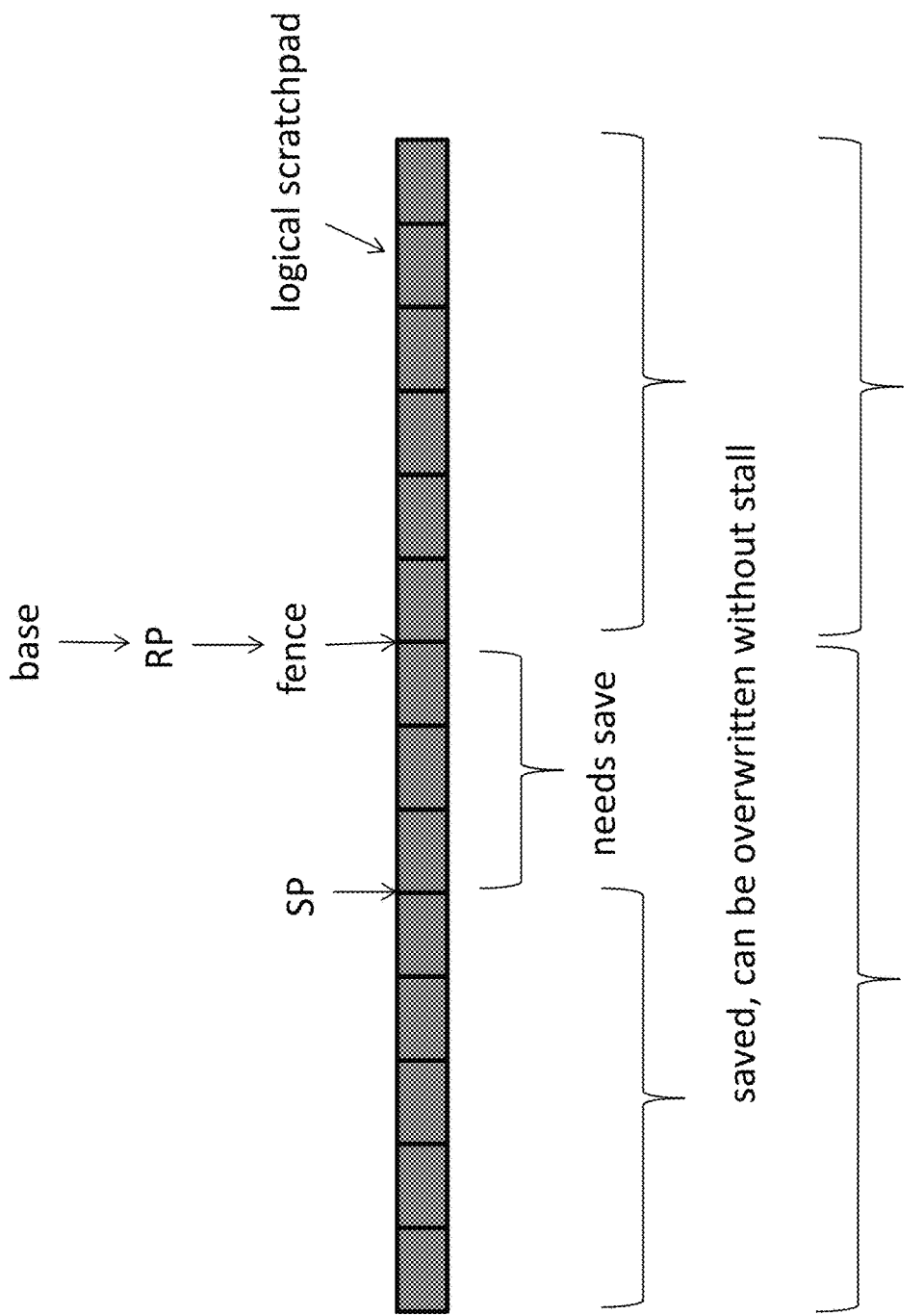

FIG. 10B shows the context of the Base, Fence, SP and RP registers after a CALL operation and before a SCRATCHF operation. In this case, the execution logic of the CPU/Core 102 has set Base to the physical position corresponding to Fence. The difference between SP and Base defines a portion of the scratchpad (between SP and Base) that needs to be saved. Note that scratchpad data portions outside this window (between SP and Base) can be overwritten without stall as noted in FIG. 10B. Moreover, none of the scratchpad data remains to be restored (as indicated by RP and Fence pointing to the same scratchpad address). Thus, all of the scratchpad data can be returned to without stall as noted in FIG. 10B.

Figure 10C:
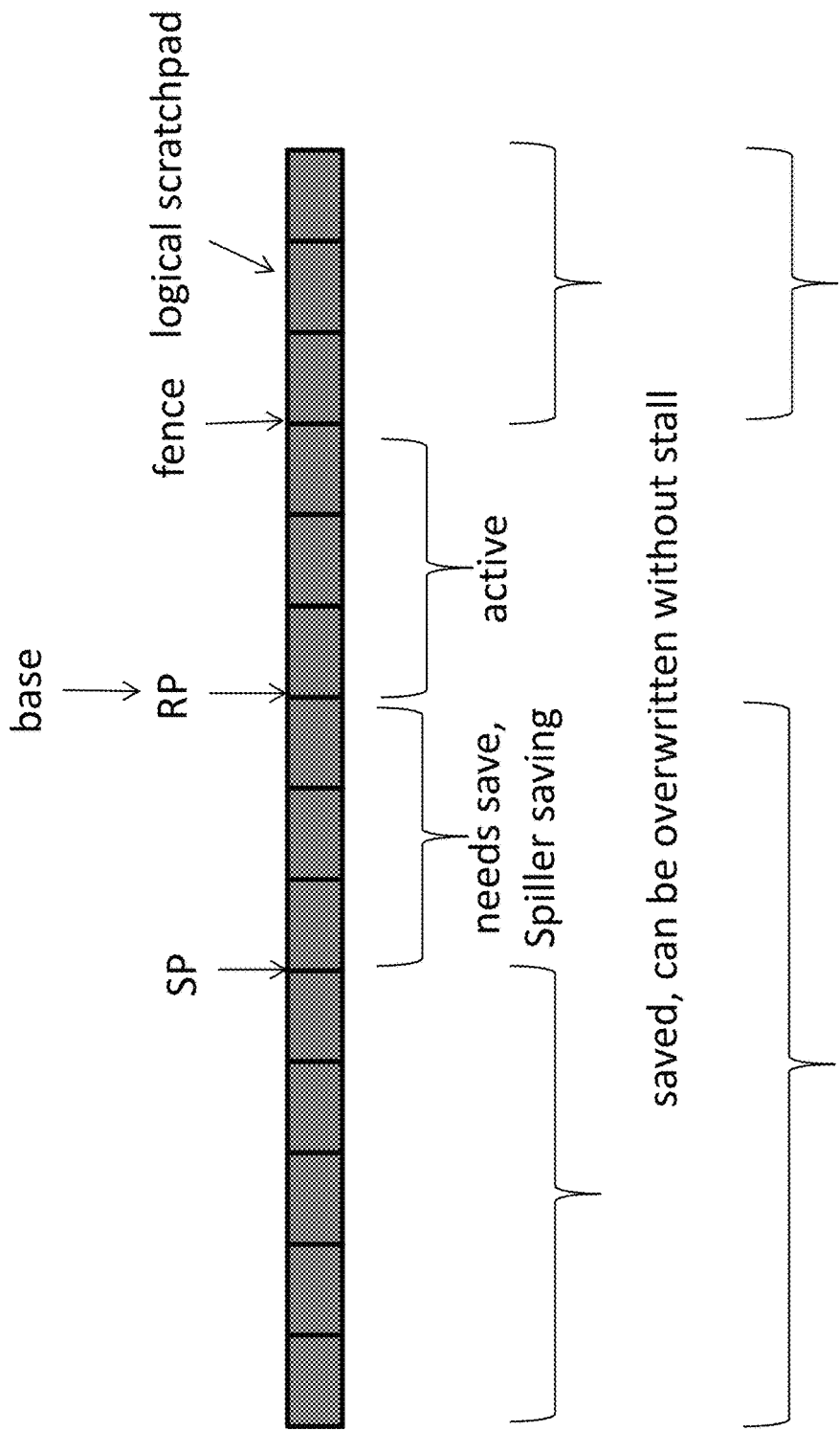

FIG. 10C shows the context of the Base, Fence, SP and RP registers after a SCRATCHF operation (and before a RETURN operation) with the Spiller working. In executing the SCRATCHF operation, the execution logic of the CPU/Core 102 sets Fence to the logical sum of Base and the SCRATCHF argument to allocate the scratchpad data portions between Base and Fence to the active frame. In this case, the difference between SP and Base defines a portion of the scratchpad outside the window for the active frame (between Base and Fence) that needs to be saved. The execution logic notifies the Spiller that this scratchpad portion between SP and Base is eligible for saving. The Spiller can operate to save a copy of the contents of this scratchpad portion (between SP and Base) in an asynchronous manner without stall as noted in FIG. 10C. Note that scratchpad data portions outside both the window for the active frame (between Base and Fence) and the save window that the Spiller is saving (between SP and Base) can be overwritten without stall as noted in FIG. 10C. Moreover, all scratchpad data portions outside the window for the active frame (between Base and Fence) have been restored (as indicated by the RP and Base pointing to the same address) and nothing remains to be restored (as indicated by RP and Fence pointing to the window for the active frame). Thus, the scratchpad data portions outside the window for the active frame can be returned to without stall as noted in FIG. 10C.

Figure 10D:
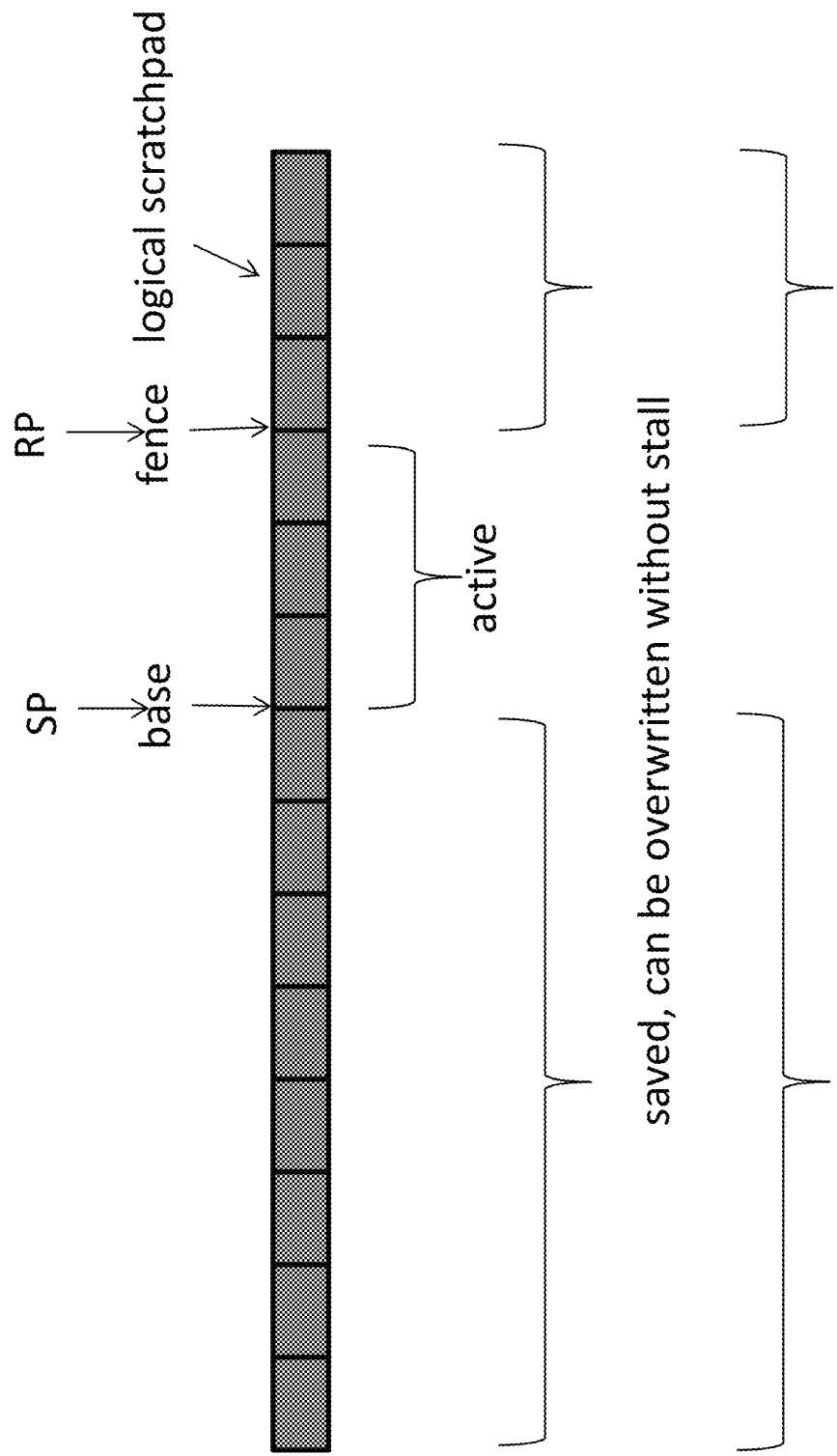

FIG. 10D shows the context of the Base, Fence, SP and RP registers after a SCRATCHF operation (and before a RETURN operation) with the Spiller having completed saving the contents of the scratchpad portion (between SP and Base) as initiated in FIG. 10C. After the save operation is complete, SP is set to Base as shown. Similar to FIG. 10A, in this case, the scratchpad data portions outside the window for the active frame (between Base and Fence) have been saved (as indicated by SP and Fence pointing to the active window) and nothing remains to be saved (as indicated by SP and Base pointing to the same scratchpad address). Thus, the scratchpad data portions outside the window for the active frame can be overwritten without stall as noted in FIG. 10D. Similarly, the scratchpad data portions outside the window for the active frame (between Base and Fence) have been restored (as indicated by the RP and Base pointing to the active window) and nothing remains to be restored (as indicated by RP and Fence pointing to the same scratchpad address). Thus, the scratchpad data portions outside the window for the active frame can be returned to without stall as noted in FIG. 1 0D.

FIG. 10E shows the context of the Base, Fence, SP and RP registers after a RETURN operation with the Spiller working. In executing the RETURN operation, the execution logic of the CPU/Core 102 sets Fence to the physical position corresponding to Base, and restores Base to the value previously saved during CALL. In this case, the difference between RP and Fence defines a portion of the scratchpad outside the window for the active frame (between Base and Fence) that needs to be restored. The execution logic notifies the Spiller that this scratchpad portion between RP and Fence is eligible for restoring. The Spiller can operate to restore the contents of this scratchpad portion (between RP and Fence) asynchronously without stall as noted in FIG. 10E. Note that scratchpad data portions outside both the window for the active frame (between Base and Fence) and the restore window that the Spiller is restoring (between RP and Fence) can be returned to without stall as noted in FIG. 1 0E. Moreover, the scratchpad data portions outside the window for the active frame (between Base and Fence) have been saved (as indicated by SP and Fence pointing to the active window) and nothing remains to be saved (as indicated by SP and Base pointing to the same scratchpad address). Thus, the scratchpad data portions outside the window for the active frame can be overwritten without stall as noted in FIG. 10E.

Figure 10F:
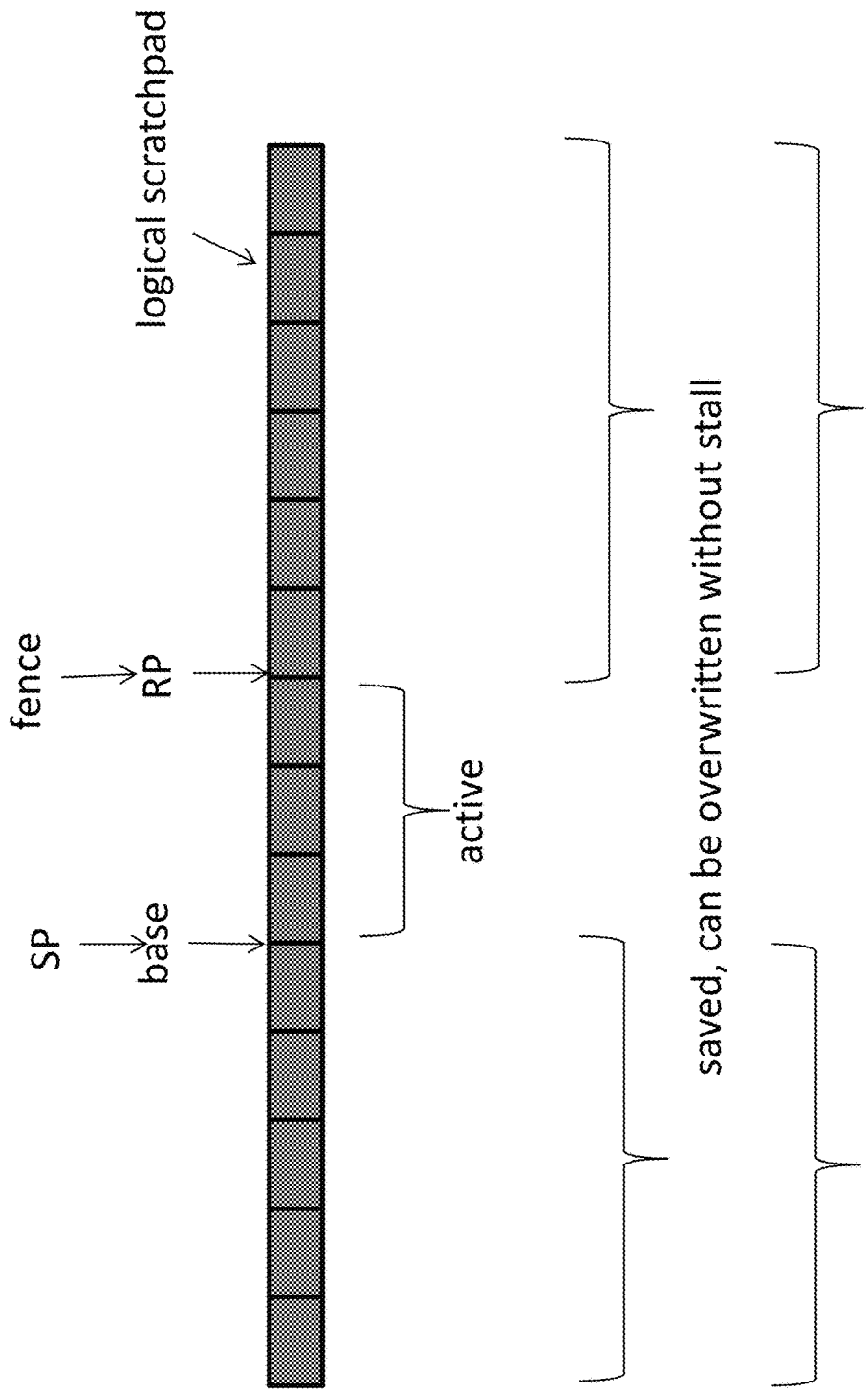

FIG. 10F shows the context of the Base, Fence, SP and RP registers after a RETURN operation with the Spiller having completed restoring the contents of the scratchpad portion (between RP and Fence) as initiated in FIG. 10E. After the restore operation is complete, RP is set to Fence as shown. Similar to FIG. 10A, in this case, the scratchpad data portions outside the window for the active frame (between Base and Fence) have been saved (as indicated by SP and Fence pointing to the active window) and nothing remains to be saved (as indicated by SP and Base pointing to the same scratchpad address). Thus, the scratchpad data portions outside the window for the active frame can be overwritten without stall as noted in FIG. 10F. Similarly, the scratchpad data portions outside the window for the active frame (between Base and Fence) have been restored (as indicated by the RP and Base pointing to the active window) and nothing remains to be restored (as indicated by RP and Fence pointing to the same scratchpad address). Thus, the scratchpad data portions outside the window for the active frame can be returned to without stall as noted in FIG. 10F.

Note that in the example of FIG. 10C, the SCRATCHF operation does not cause Fence to be set beyond SP. In this case, the save operations of the Spiller can be carried out asynchronously with respect to the execution of the active frame and the execution of the active frame does not need to be stalled to allow for the save operations of the Spiller. However, note that if SCRATCHF operation caused Fence to be set beyond SP, the execution of the active frame would need to be stalled to provide time for the Spiller to complete its save operation. It is not necessary to stall immediately when the SCRATCHF operation causes Fence to be set beyond SP. Instead, stall may be deferred until a SPILL operation addresses between SP and Fence. In this way, the Spiller has extra time to do the necessary saving or restoring in the background, without causing the program to stall, and may avoid stall entirely before execution of the active frame can resume.

Also note that in the example of FIG. 10E, the RETURN operation does not restore Base to a value before RP. In this case, the restore operations of the Spiller can be carried out asynchronously with respect to the execution of the active frame and the execution of the active frame does not need to be stalled to allow for the restore operations of the Spiller. However, note that if the RETURN operation does restore Base to a value before RP, the execution of the active frame would need to be stalled to provide time for the Spiller to complete its restore operation. It is not necessary to stall immediately when the RETURN operation restores Base to a value before RP. Instead, stall may be deferred until a FILL operation addresses between Base and RP. In this way, the Spiller has extra time to do the necessary saving or restoring in the background, without causing the program to stall, and may avoid stall entirely before execution of the active frame can resume.

Note that similar operations can be carried out by the Spiller in handling an Interrupt.

Also note that the logical belt temporal address of previously produced results depends on temporal production order. Thus, a subsequent operation expecting to use a particular result must know where in the sequence of results the desired value was produced. More strongly, it must know this at compile time when the operation was encoded by a compiler, assembler or other tool. Consequently, while it is possible for operations using temporal addressing to complete execution out of order, the results must be inserted into the storage elements of the belt using the scheduled order. Thus, a CPU that utilizes temporal addressing may be in-order or out-of-order with respect to execution, but must be in-order with respect to argument fetch and result retire. This means that temporal machines are naturally statically scheduled.

It is also possible to employ the temporal addressing mechanisms described herein in other CPU architectures, such as dynamically scheduled out-of-order architectures employed by most modern general-register processors. As in these machines, a dynamically scheduled belt can be used to virtualize the belt (corresponding to virtualizing the general registers) so that logical belt temporal address are merely names that are mapped by a hardware scheduler to internal buffer numbers. During execution operands would come from buffers and results go to buffers, and the apparent belt would only be realized back to the architectural state when an interrupt or other event caused the out-of-order execution to break off. Such a design would have the encoding entropy advantages of a belt machine, but internally would resemble a conventional out-of-order design.

There have been described and illustrated herein several embodiments of a computer process and corresponding method of operations. While particular embodiments of the invention have been described, it is not intended that the invention be limited thereto, as it is intended that the invention be as broad in scope as the art will allow and that the specification be read likewise. For example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processor comprising:
    a plurality of functional units that performs operations specified by the at least one instruction over multiple cycles, wherein the operations produce result operands at different characteristic latencies over the multiple cycles; and
    an interconnect network that provides data paths for transfer of operand data between the plurality of functional units, the interconnect network including first and second crossbar parts, wherein the first crossbar part is configured to route result operands produced with the lowest characteristic latency to any functional unit of the plurality of functional units, and wherein the second crossbar part is configured to route result operands with higher characteristic latency relative to the lowest characteristic latency to the first crossbar part where such result operands are in turn routed to any functional unit of the plurality of functional units.

2. A computer processor according to claim 1, wherein:
    the characteristic latencies are defined in terms of number of machine cycles.

3. A computer processor according to claim 2, wherein:
    the lowest characteristic latency corresponds to a single machine cycle.

4. A computer processor according to claim 1, wherein:
    the functional units are organized as multiple slots where each slot has a configuration that produces multiple result operands of different characteristic latencies in the same cycle, and wherein each slot employs separate result registers for each characteristic latency present on the slot.

5. A computer processor according to claim 4, wherein:
    the result register of each slot that stores a result operand of lowest characteristic latency is operably coupled to the input side of the first crossbar part; and
    the result registers of each slot that stores result operands of higher characteristic latency is operably coupled to the input side of the second crossbar part.

6. A computer processor according to claim 4, wherein:
    the result registers of the slot are organized as a shift register where the result register for lowest latency operands is at the input end of the shift register and the result register for highest latency operands is at the output end of the shift register.

7. A computer processor according to claim 6, wherein:
    each result operand stored in the shift register is shifted to the next-higher latency result register between cycles.

8. A computer processor comprising:
    a plurality of functional units that performs operations specified by the at least one instruction over the multiple cycles, wherein the functional units are organized as multiple slots where each slot has a configuration that produces multiple result operands of different characteristic latencies in the same cycle, and wherein each slot employs separate output registers for each characteristic latency present on the slot.

9. A computer processor according to claim 8, wherein:
    each slot includes data paths to store their result operands produced by the functional units of the slot into the appropriate output registers of the slot that correspond to the characteristic latencies of such result operands.

10. A computer processor according to claim 8, wherein:
    the output registers of the slot are organized as a shift register where the output register for lowest latency operands is at the input end of the shift register and the output register for highest latency operands is at the output end of the shift register.

11. A computer processor according to claim 10, wherein:
    each result operand stored in the shift register is shifted to the next-higher latency output register between cycles.

\* \* \* \* \*